US008633699B2

(12) United States Patent
Linscott et al.

(10) Patent No.: US 8,633,699 B2
(45) Date of Patent: Jan. 21, 2014

(54) TECHNIQUES FOR DETERMINING PHYSICAL PROPERTIES OF UNDERGROUND STRUCTURES USING LIGHTNING

(75) Inventors: Ivan Richard Linscott, Stanford, CA (US); Timothy Chevalier, Marlborough, MA (US); Umran S. Inan, Stanford, CA (US); David Strauss, Menlo Park, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 531 days.

(21) Appl. No.: 12/869,230

(22) Filed: Aug. 26, 2010

(65) Prior Publication Data

US 2011/0095763 A1    Apr. 28, 2011

Related U.S. Application Data

(60) Provisional application No. 61/237,074, filed on Aug. 26, 2009.

(51) Int. Cl.
*G01V 3/12* (2006.01)
(52) U.S. Cl.
USPC .................................... 324/344; 324/72
(58) Field of Classification Search
None
See application file for complete search history.

(56) References Cited

U.S. PATENT DOCUMENTS 2,992,325 A * 7/1961 Lehan ........................... 455/40
3,136,943 A * 6/1964 Slichter ......................... 324/344
2002/0043976 A1* 4/2002 Holladay et al. ............... 324/334

FOREIGN PATENT DOCUMENTS

DE    202005016248    *  3/2006
EP        0161940    *  11/1985

OTHER PUBLICATIONS

M. Chevalier & U. Inan, "A Technique for Efficiently Modeling Long-Path Propagation for Use in Both FDFD and FDTD", "IEEE Antennas and Wireless Propagation Letters", 2006, pp. 525-528, vol. 5, Publisher: IEEE.
Steven A. Cummer, "Lightning and Ionospheric Remote Sensing Using VLF/ELF Radio Atmospherics", "Dissertation in partial fulfillment for Ph.D.", Aug. 1997, pp. 1-152, Publisher: Stanford University, Published in: Atherton, CA/USA.

(Continued)

*Primary Examiner* — Vinh Nguyen
(74) *Attorney, Agent, or Firm* — Evans & Molinelli PLLC; Eugene J. Molinelli

(57) ABSTRACT

A method and apparatus includes detecting lightning induced electromagnetic pulses and determining a physical property of an underground structure based on the lightning induced electromagnetic pulses. In some embodiments, an apparatus includes an antenna, a low noise amplifier, a processor, cable, and a transmitter. The antenna includes three substantively perpendicular loops of electrical conductors. The processor is configured to condition the amplified signal. The cable is about 100 meters in length and connects the low noise amplifier to the processor. The transmitter is configured to send conditioned data to a data aggregation system.

19 Claims, 20 Drawing Sheets

(56) References Cited

OTHER PUBLICATIONS

Jerry A. Ferguson, "Long Wave Propagation Model", "Military Communications Conference, 1989", 1989, pp. 593-597, vol. 2, Publisher: IEEE, Published in: http://ieeexplore.ieee.org/search/freesrchabstract.jsp?tp=&arnumber=103994&openedRefinements%3D*%26filter%3DAND%28NOT%284283010803%29%29%26-search Field.

J. A. Ferguson, "Computer Programs for Assessment of Long-Wavelength Radio Communications, Version 2.0", "Technical Document 3030", May 1998, pp. 1-56, Publisher: Space and Naval Warfare Systems Center San Diego, Published in: San Diego, CA/USA.

Robert A. Marshall, "Very Low Frequency Radio Signatures of Transient Luminous Events Above Thunderstorms", "Dissertation in partial fulfillment of Ph.D.", May 2009, pp. 1-184, Publisher: Stanford University, Published in: Atherton, CA/USA.

R. Pappert and J. Ferguson, "VLF/LF mode conversion model calculations for air to air transmissions in the earth-ionosphere waveguide", "Radio Science", 1986, pp. 551-558, vol. 21, No. 4, Publisher: American Geophysical Union, Published in: Washington DC/USA.

\* cited by examiner

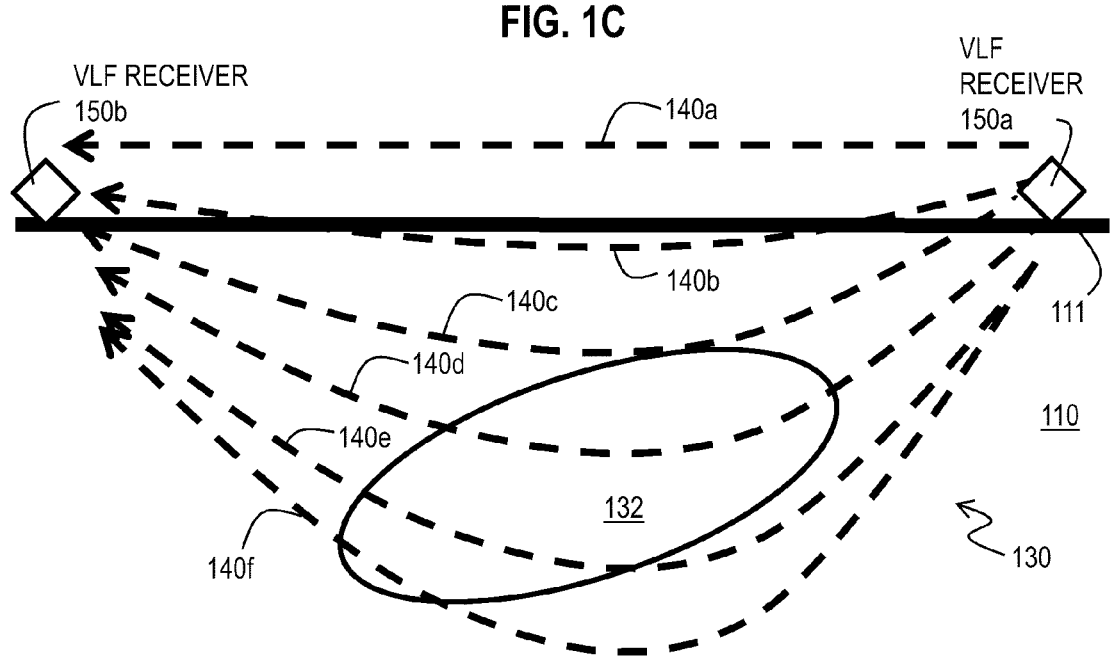

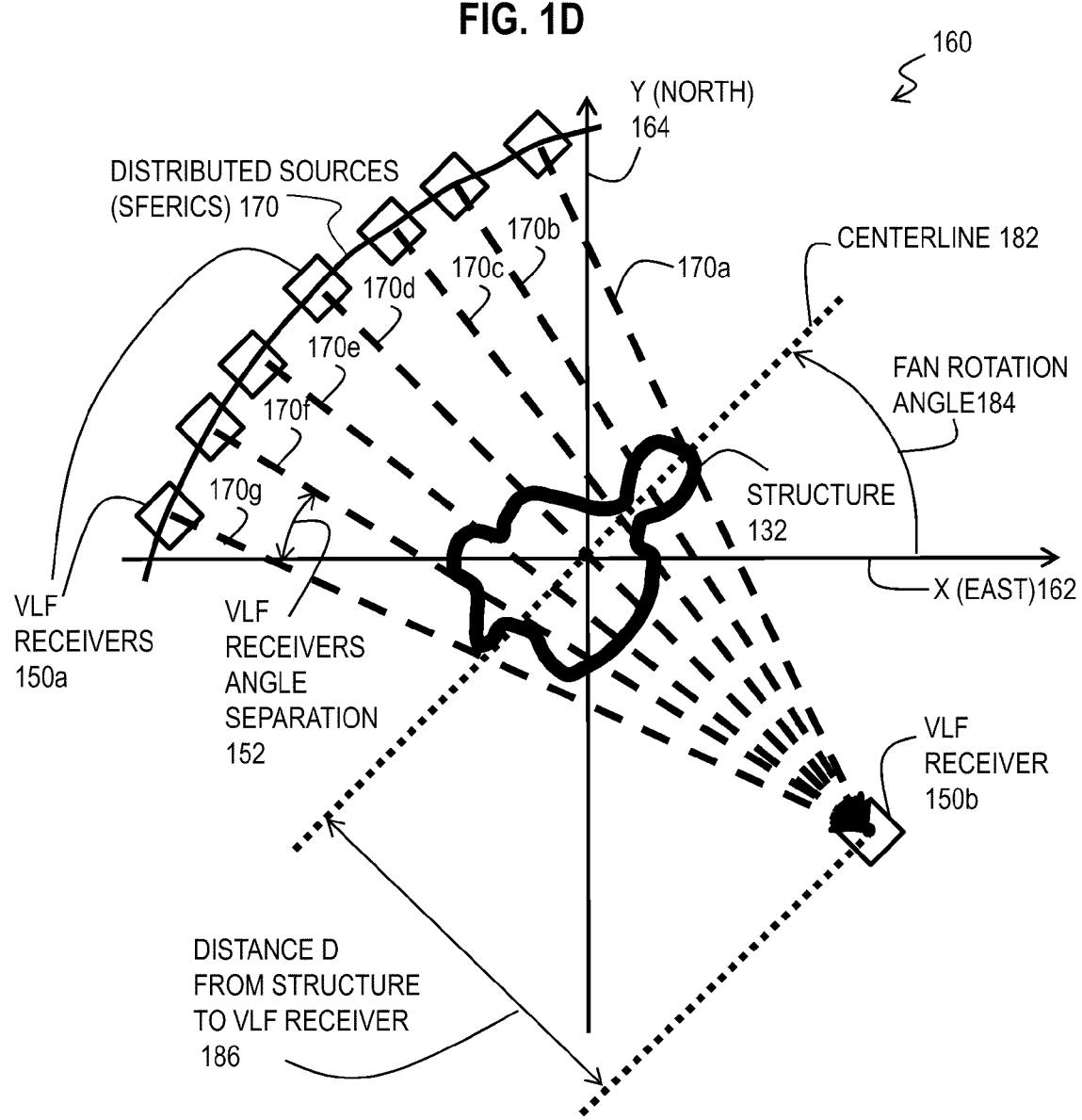

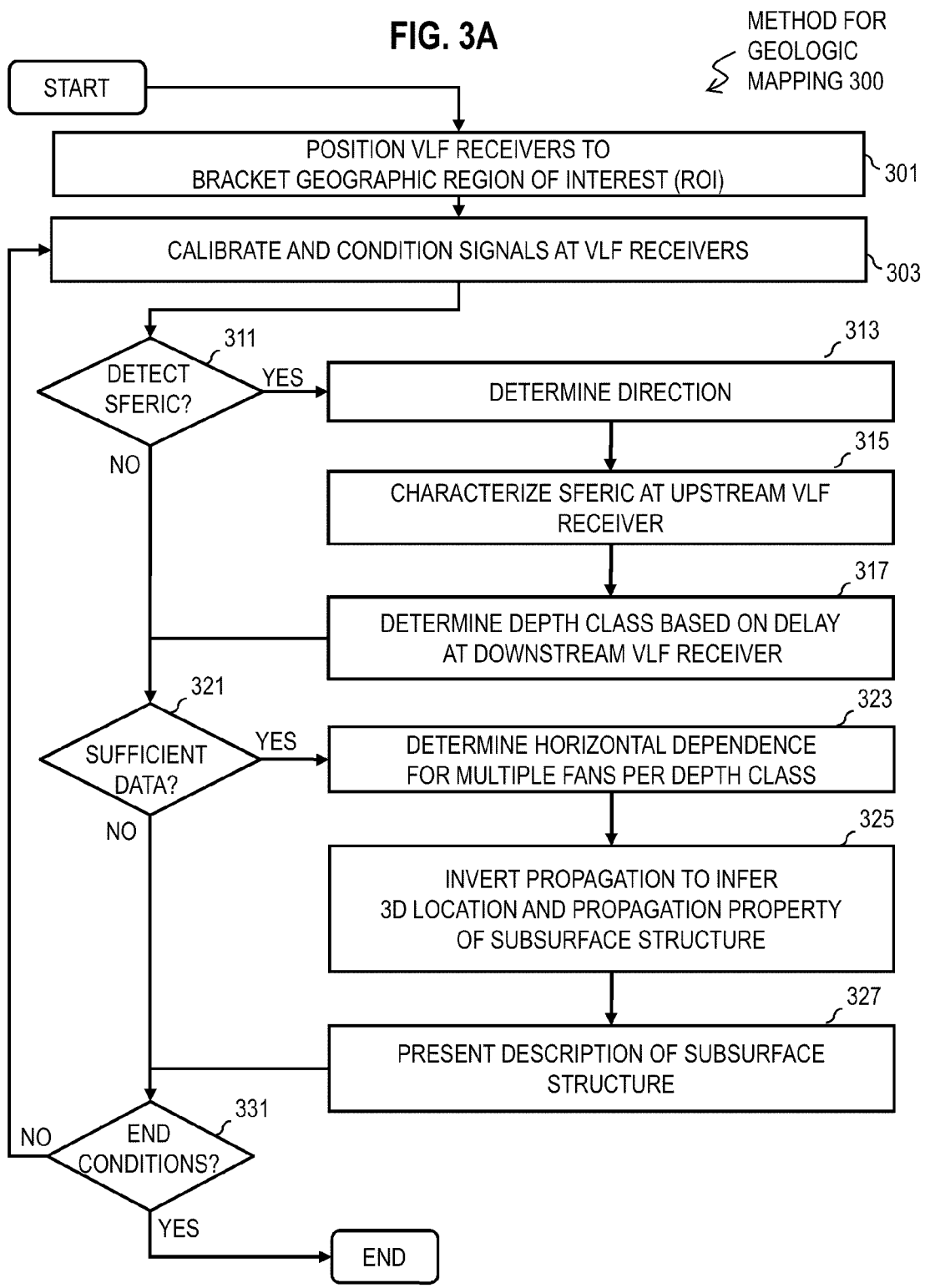

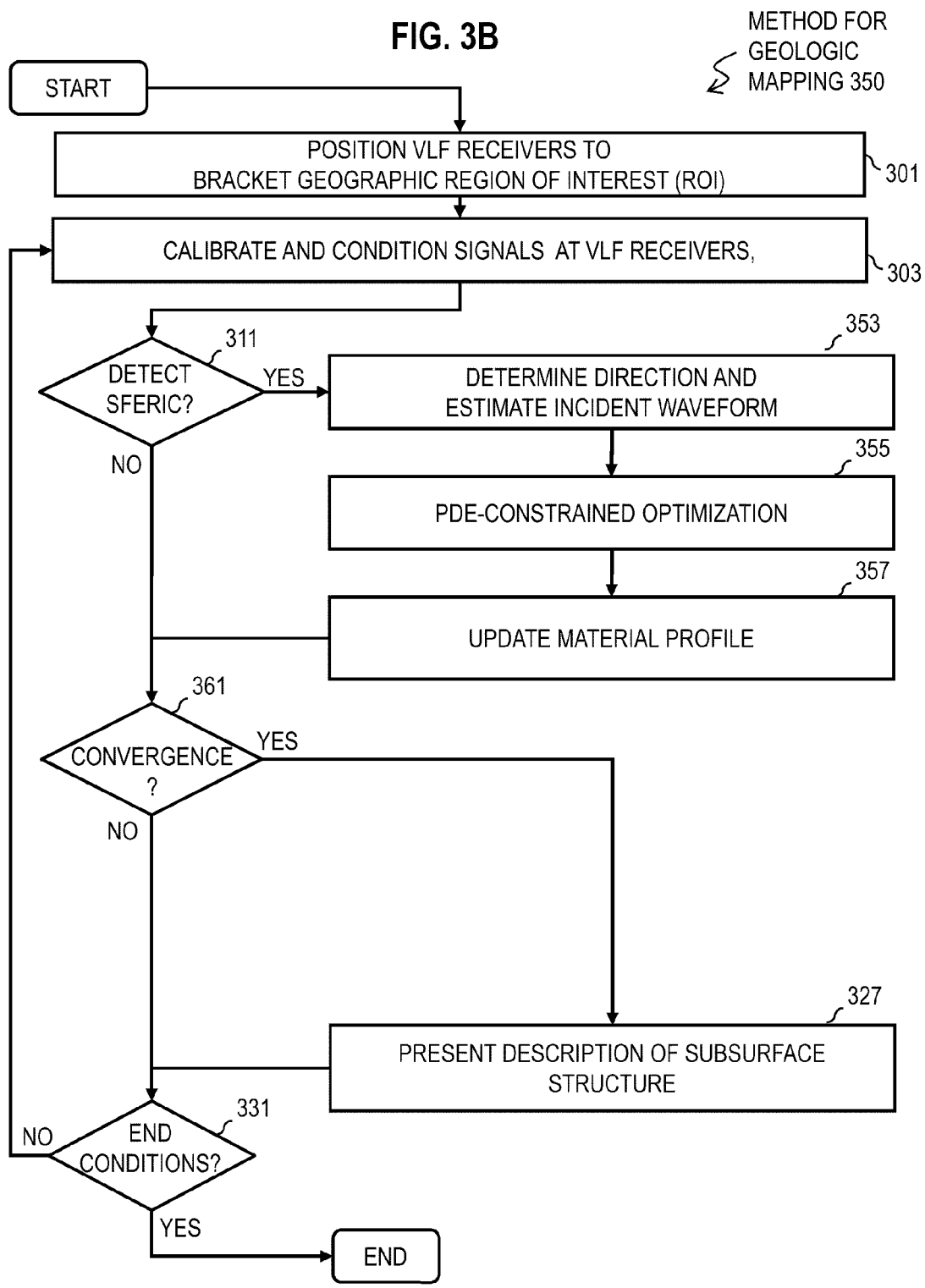

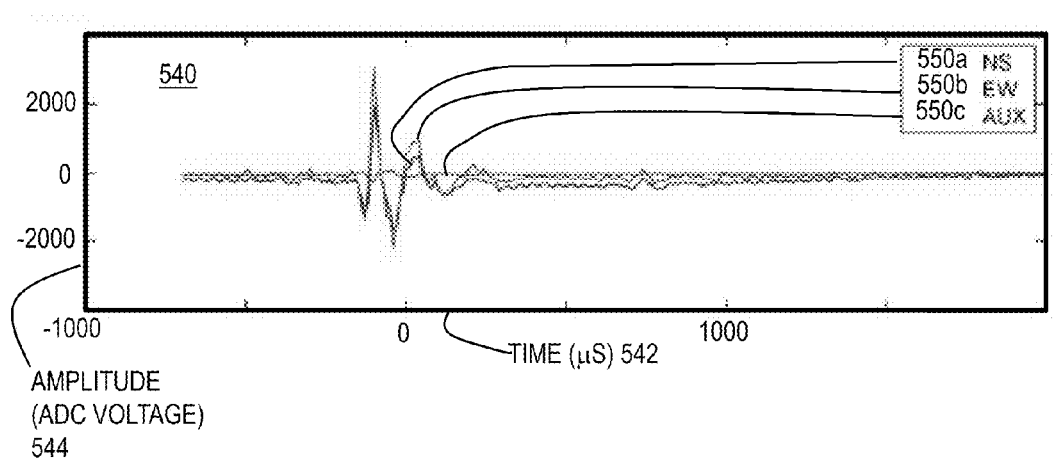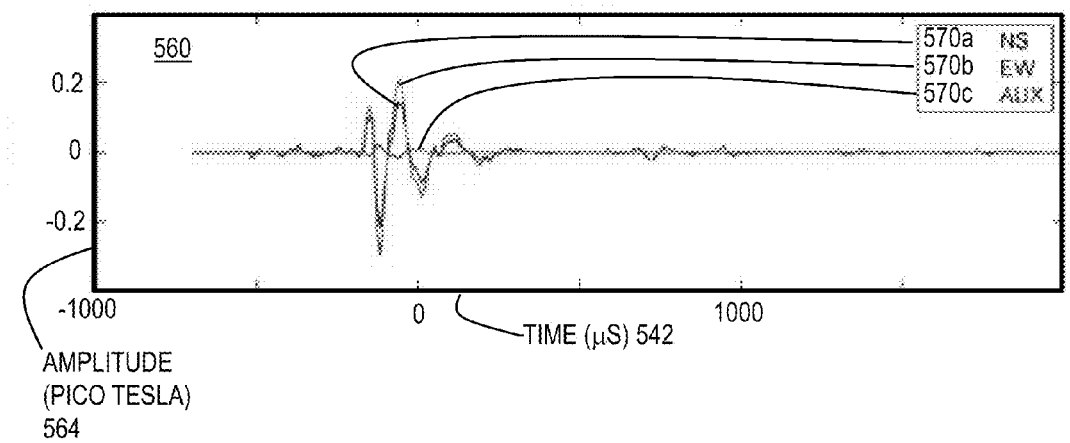

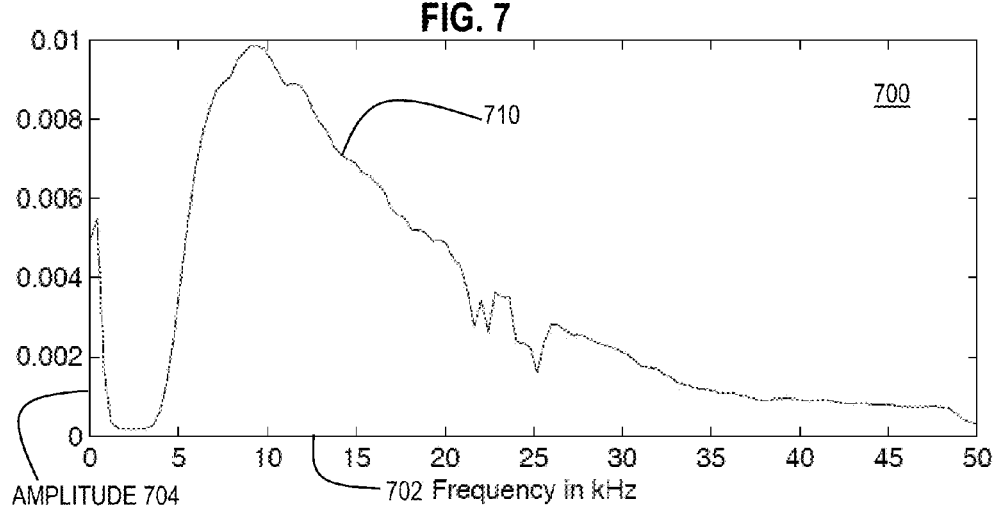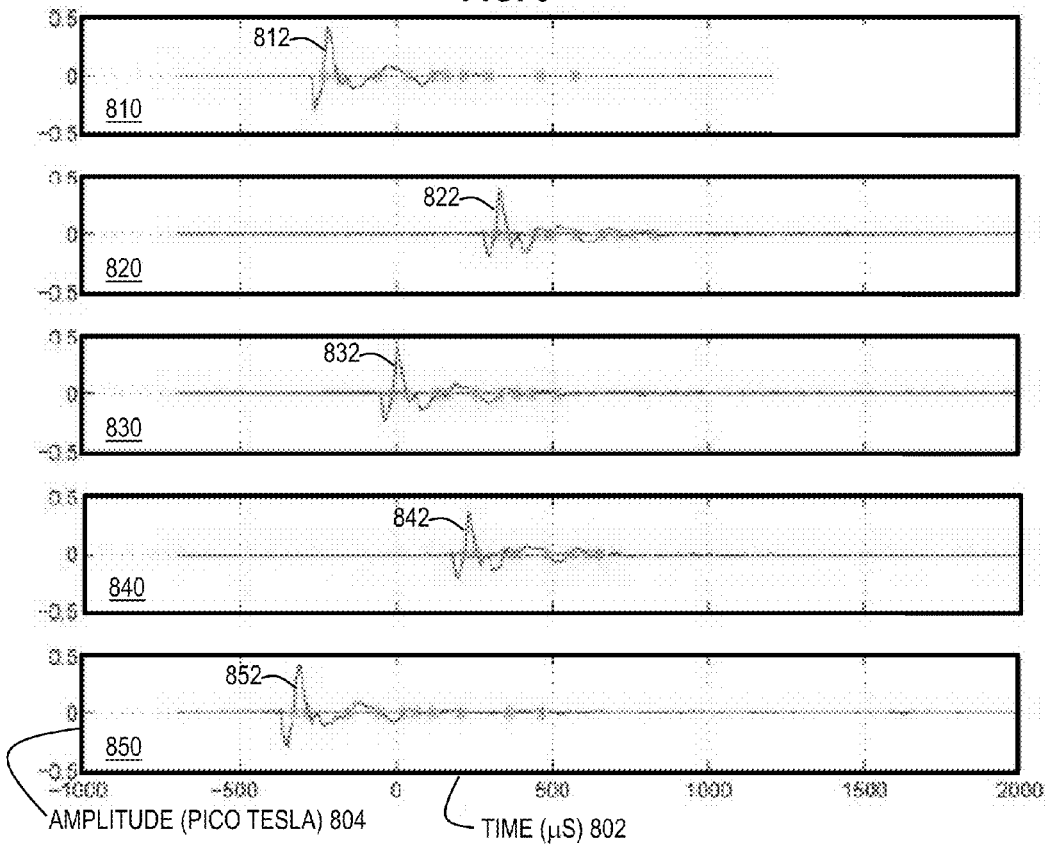

Location of Receivers in ID, Aug. 2009

FIG. 14A
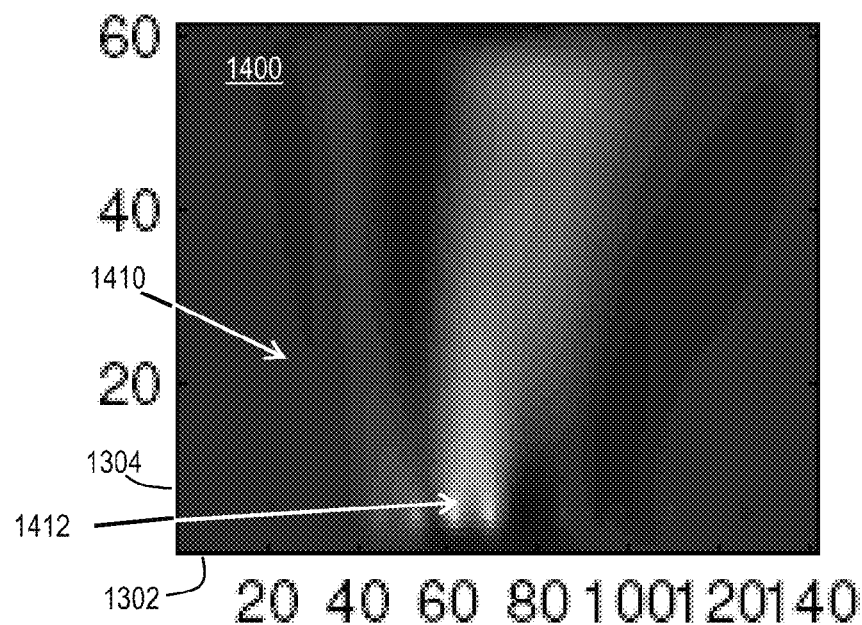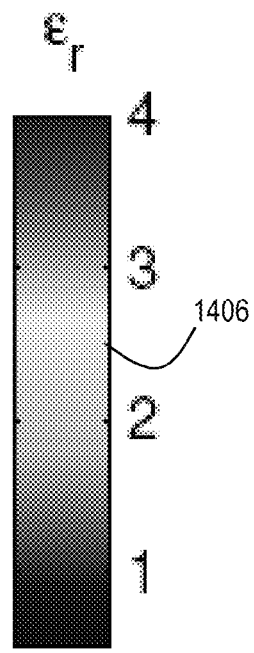
FIG. 14B
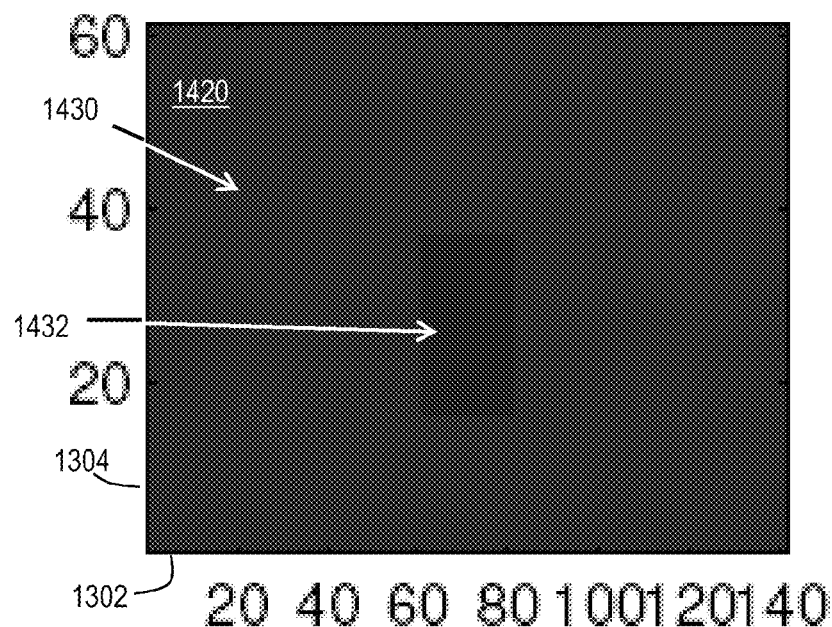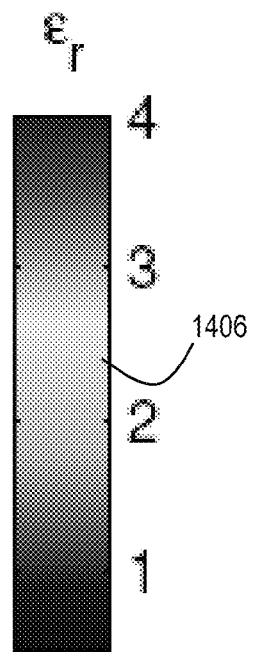

TECHNIQUES FOR DETERMINING PHYSICAL PROPERTIES OF UNDERGROUND STRUCTURES USING LIGHTNING

CROSS-REFERENCE TO RELATED APPLICATIONS

This application claims benefit of Provisional Appln. 61/237,074, filed Aug. 26, 2009, the entire contents of which are hereby incorporated by reference as if fully set forth herein, under 35 U.S.C. §119(e).

STATEMENT OF GOVERNMENTAL INTEREST

This invention was made with Government support under Grant 16: ANT0636927 awarded by the National Science Foundation. The Government has certain rights in the invention.

BACKGROUND

Geological surveys to discover natural and manmade structures below the surface of the ground often employ very low frequency acoustic sources and arrays of very low frequency acoustic sensors. Such surveys produce images of underground structures, both man-made and geological, for the purpose of assisting geological and geophysical exploration, such as mineral, oil and natural gas exploration, discovery of underground tunnels, and earthquake fault zone mapping. While suitable for many purposes, such surveys suffer some disadvantages, including that they require large energy sources, involve wide ranging placement of acoustic sources and sensors and the associated costs, and can disrupt animal and human activity.

SOME EXAMPLE EMBODIMENTS

Therefore, there is a need for an approach for discovering or mapping natural or manmade structures below the surface of the ground that do not suffer one or more of the disadvantages of acoustic surveys.

According to one set of embodiments, a method uses lightning induced electromagnetic pulses (EMPs) to determine a physical property of an underground structure.

According to another set of embodiments, an apparatus comprises at least one processor, and at least one memory including computer program code, the at least one memory and the computer program code configured to, with the at least one processor, cause the apparatus to a determine a physical property of an underground structure based on measurements of lightning induced electromagnetic pulses (EMPs).

According to another set of embodiments, a computer-readable storage medium carrying one or more sequences of one or more instructions which, when executed by one or more processors, cause an apparatus to determine a physical property of an underground structure based on measurements of lightning induced electromagnetic pulses (EMPs).

According to another set of embodiments, an apparatus comprises means for detecting lightning induced electromagnetic pulses (EMPs) and means for determining a physical property of an underground structure based on those measurements.

According to another set of embodiments, an apparatus comprises an antenna, a low noise amplifier, a cable, a processor and a transmitter. The antenna comprises three substantively perpendicular loops of electrical conductors. The low noise amplifier is configured to amplify electromagnetic signals from each loop in a frequency band of interest from about 1.5 kiloHertz to about 50 kiloHertz without emitting airborne electromagnetic waves in the frequency band of interest substantively above an antenna noise threshold. The processor is configured to condition the amplified signal. The cable of about 100 meter length is configured to connect the low noise amplifier to the processor. The transmitter is configured to send conditioned data to a data aggregation system.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings, in which identical items are indicated by identical call out numbers; and in which:

FIG. 1C is a diagram that illustrates an example use of a lightning induced electromagnetic pulse as a source for probing an underground structure, according to an embodiment;

FIG. 1D is a diagram that illustrates an example use of multiple lightning induced electromagnetic pulses as a distributed horizontal source for probing an underground structure, according to an embodiment;

FIG. 3A is a flow diagram that illustrates an example method for mapping an underground structure based on measurements of lightning induced electromagnetic pulses, according to an embodiment;

FIG. 3B is a flow diagram that illustrates an example method for mapping an underground structure based on measurements of lightning induced electromagnetic pulses, according to another embodiment;

FIG. 5C and FIG. 5D are graphs that illustrate an example of calibrating and conditioning a VLF signal that includes a sferic pulse, according to an embodiment;

FIG. 7 is a graph that illustrates an example average electromagnetic frequency spectrum of thousands of detected sferic pulses, according to an embodiment;

FIG. 8 is a stack of graphs that illustrates similarity of a detected sferic pulse as the sferic propagates over hundreds of kilometers, according to an embodiment;

FIG. 14A is a graph that illustrates an example inferred distribution of permittivity based on computer tomography and simulated VLF signal changes, according to an embodiment;

FIG. 14B is a graph that illustrates a correct distribution of permittivity used to simulate VLF signal changes, according to an embodiment;

DESCRIPTION OF SOME EMBODIMENTS

Figure 1A:
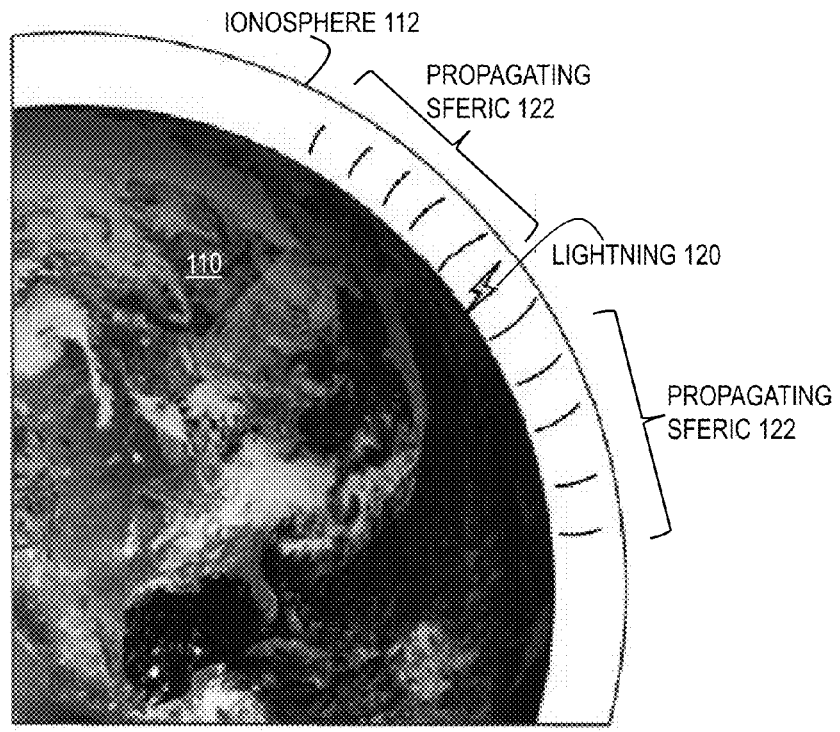
FIGS. 1A and 1B are diagrams that illustrate example long-range propagation of lightning induced electromagnetic pulses, called sferics.

Techniques for mapping underground structures based on measurements of lightning induced electromagnetic pulses (EMPs) are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term underground structure refers to any natural or manmade structure that is disposed below the surface of the ground. The ground refers to any non-fluid portion of the surface of the planet Earth, and is synonymous with earth in referring to either soil or rock or other material. Underground structure and subsurface structure are used interchangeably herein.

Lightning induced electromagnetic pulses (EMPs) propagate over large distances in the earth-ionosphere waveguide at very low frequency (VLF), and arrive at nearly all places on the earth from nearly all directions, but concentrated in the directions of major thunderstorms. At any location, the long-range, lightning-induced EMPs, which are also called radio atmospherics, and abbreviated as "sferics," penetrate the earth to large depths and scatter from underground structures. The scattered EMPs propagate back to the ground's surface and are detectable on the surface using simple VLF magnetic loop antennas of modest size. Because such sferics travel such long distances, e.g., thousands of miles, there are many arrivals at any single location from a wide range of directions. Thus such sferics provide a potential distributed source for geologic mapping over an extended area.

As used herein VLF signals and pulses and waveforms refer to VLF electromagnetic signals and electromagnetic pulses and electromagnetic waveforms, unless otherwise clear from the context.

According to some embodiments, the detection of these VLF scattered electromagnetic responses is much improved using highly sensitive methods in antenna and low noise VLF receiver design. According to some embodiments, the scattered responses are then inverted to infer the underground structures that scattered the EMPs. In some embodiments, changes between upstream and downstream properties of the sferics are used to deduce one or more subsurface properties.

To produce an image of the underground scatterers according to some embodiments, an array of VLF receivers is placed on the surface above the scatterers and their associated geological structures. The responses from illuminating sferics are detected in this array and stored as temporally sampled VLF waveforms in three receiver channels. Two channels are connected to orthogonal, vertical magnetic antenna loops and one channel is connected to a horizontal magnetic antenna loop. The vertical loops capture the sferics transverse field, while the horizontal loop captures the vertical field of the scattered response. In an example embodiment, waveforms from all three channels are amplified in low noise amplifiers (LNAs), band limited to 50 kHz (kHz, where 1 kHz=$10^3$ Hertz and 1 Hertz, Hz, is one cycle per second) by anti-aliasing filters, and sampled at 100 kilosamples per second (kS/s, 1 kS=$10^3$ samples). The sampled waveforms are stored by a computer-based data acquisition system.

According to some embodiments, the recorded VLF waveforms of lightning-induced sferics and their underground response, from the array of VLF antennas and receivers, are processed using inversion to obtain an image, or representation, of the underground structures responsible for scattering the sferics.

The use of lightning induced sferics is not previously known for geological exploration. Up to now, sferics have been considered as unwanted noise that interfered with the detection of narrow-band transmitters (VLF sources). Narrow-band transmitters, both remote and local, are the principal means in former approaches for exploration using VLF. Transmitters are often constructed in the field for exploration methods. What was not realized in former approaches is that the lightning generated sferics are very strong and detectable as individual pulses (an individual pulse is called a sferic herein) with high signal-to-noise margins, and that the broad band and multi-directional nature of the sferics is a major technical opportunity for mapping structures at different resolutions and depths, thus producing discoveries of major deposits of both precious and common metals and minerals as well as major reserves of oil and gas and some man-made structures, such as tunnels, mine shafts and bunkers.

The use of the illustrated VLF receivers for sferic detection affords greater sensitivity and produces commensurate improvements in the resolution, artifact suppression and ambiguity reduction of the reconstructed images. The reconstructed image resolution and quality is additionally enhanced using illustrated methods of sferic characterization, direction of arrival estimation, and selection. Especially useful in sferic characterization is the ability to determine the precise sferic waveform shape and elevation arrival direction using the illustrated computational computer codes and electromagnetic models.

Although some embodiments using virtual structure are described for purposes of illustration, in other embodiments, the use of lightning for underground mapping is applied to (a) mineral exploration, such as prospecting for both precious and common metals, (b) oil and gas exploration, (c) detection and discovery of man-made underground structures such as tunnels and bunkers, and (d) large urban configuration estimation and control through the use of large arrays of VLF antennas and receivers.

Further details are provided in the following sections: 1] Sferics Electromagnetic Pulse (EMP) Review; 2] System Overview; 3] Data Collection Equipment; 4] Measurement Conditioning; 5] Sferic Arrival Structure Reconstruction; 6] Inversion to Derive one or more Underground Structures; 7] Computer Hardware Overview; 8] References; and 9] Alternatives and modifications.

1. SFERICS ELECTROMAGNETIC PULSE (EMP) REVIEW

Lightning is manifested in three primary charge configurations: positive cloud to ground (CG+); negative cloud to ground (CG−); and, intra-cloud lightning. Of the three, the positive cloud to ground (CG+), is the likely source of the electromagnetic pulses that becomes sferics, because this configuration appears as the rapid discharge of an electric dipole between charged clouds and the image charge in the conductive earth. This electric discharge, with its impulsive current flow, radiates electromagnetic fields over a wide band of frequencies. In a far field approximation, the electric and magnetic fields produced by this discharge are proportional to the second derivative of the change in dipole moment. In electrodynamics, it is the second derivative, or acceleration of the charge that gives rise to radiated electromagnetic (EM), fields. EM fields would propagate isotropically in free space. However, the conductive nature of the earth, and a nearly parallel layer of conductivity due to ionized plasma about 60 kilometers (km, 1 km=$10^3$ meters) above the earth, known as the ionosphere, together form a waveguide structure in which the lightning's EMP's efficiently propagate at VLF frequencies (from about 3 kHz, to about 30 kHz).

Figure 1B:
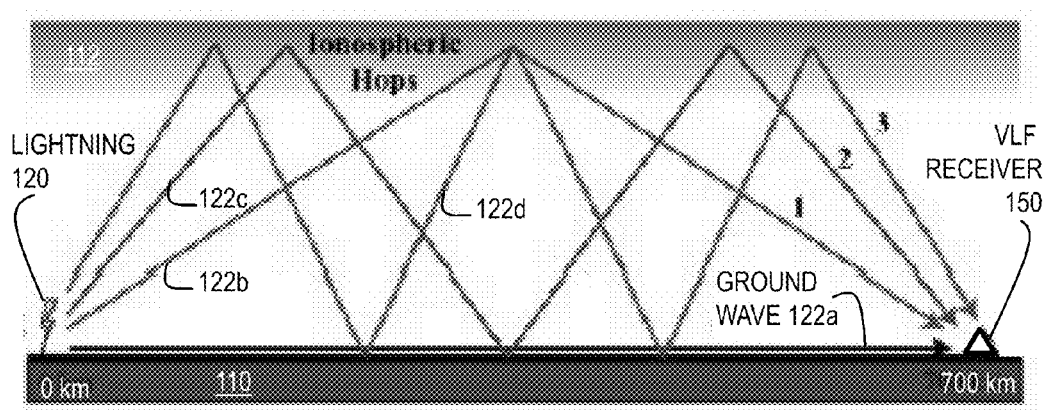

FIGS. 1A and 1B are diagrams that illustrate example long-range propagation of lightning induced electromagnetic pulses, called sferics. FIG. 1A depicts the spheroid ground 110 on a global scale with a cross section of the ionosphere 112 at about 60 km height, not drawn to scale. The location of a lightning strike is illustrated as lightning bolt 120. A waveguide formed by the ionosphere 112 and the ground 110 confines the VLF electromagnetic pulse to propagate outward as propagating sferic 122 in all horizontal directions within the waveguide.

FIG. 1B depicts the vertical modes included in a propagating sferic. The ground 110 and ionosphere 112 are depicted as shaded areas and assumed flat on the scale of the diagram, about 700 km from lightning bolt 120 to VLF receiver 150. One mode is a ground wave 122a that arrives at the receiver 150 first, followed by a single cycle mode 122b that has reflected once within the waveguide. This arrival is followed by higher vertical modes, such as a two cycle mode 122c and three cycle mode 122d, plus higher modes (not shown). As the EMP propagates over longer and longer distances, the initial, many-modal character of the EMP changes as the higher modes die out, leaving essentially only a transverse electric field (TE) mode and a transverse magnetic field (TM) mode. The transverse fields refer to fields oriented perpendicular to the direction of propagation. As these simple modes emerge, the EMP transitions into the waveform called a sferic.

The propagation of the sferic in the earth-ionosphere waveguide can be modeled with good precision on several distance scales. Both the earth and the ionosphere are well represented as conducting surfaces where the precision of the representation is chosen according to the scale, with, for example, the highest precision used for the smallest propagation distance scales. Very high resolution maps of the earth's surface are readily available, particularly from the United States Geological Survey (USGS), and can be smoothed to the appropriate scale. Representing the ionosphere as a conducting surface however involves approximations both in space and time. The height, smoothness and conductivity of the ionosphere changes from day to day, but even more strongly from day to night, and even during the course of the day. Simple scaling can account for most of these variations, if their magnitudes are known. Indeed, if sferics are recorded and later analyzed, then by and large the ionosphere's condition can be deduced.

The functional behavior of a sferic propagating between the conductive layers of the earth and the ionosphere is then modeled as a simple waveguide modified to accommodate the earth's curvature and the plasma interactions in the ionosphere's layer. Of the models developed for this purpose, Budden (1961) presents an analytical model of the ionosphere as a single layer with a tensor reflection coefficient governed by the Appleton-Hartree equation. (All references are cited fully in the references section 8.) Further, Budden's model takes into account curvature of the earth, a factor that becomes important when propagation distances are 1000 km or more. For distances less than 1000 km, ray tracing techniques (similar to the diagram of FIG. 1B) produce a good approximation of VLF electromagnetic pulse propagation.

The modal nature of a waveguide manifests distinctive features such as transverse polarization and a lower frequency cutoff. For example, a strong spectral cutoff below about 1.6 kHz exists in the Earth ionosphere waveguide. Above this cutoff, quasi-transverse electrical (TE) and quasi-transverse magnetic (TM) modes (QTE and QTM, respectively) are found. While pure TE and TM waves would possess no longitudinal fields (in the direction of propagation), the QTE and QTM modes do have some (and typically small) longitudinal electric and magnetic field components respectively. Frequencies above 30 kHz are subject to higher attenuation in the waveguide and thus do not propagate over long distances. Below 1.5 kHz, only the equivalent of a transverse electromagnetic (TEM) mode in a rectangular waveguide is present. This mode is a quasi-TEM mode and can have small longitudinal components due to the inhomogeneity of the ionosphere's lower layer that constitutes the waveguide's upper conducting surface.

Detailed computational models exist to model the sferic's propagation. Ferguson et. al. (1989) developed the Long Wave Propagation Code (LWPC) that treats the ionosphere as a series of layered media and operates in the frequency domain, hence superposition and inverse Fourier transform are used to produce time domain waveforms modeled by Cummer (1997). An alternative Segmented Long Path (SLP) code developed by Michael and Timothy Chevalier (2006) is a finite-difference time-domain (FDTD) code that models in two dimensions the earth ionospheric waveguide; and takes into account fluid plasma motion and cold plasma wave propagation. The Chevalier model produces full time domain waveform as output, but does not decompose the sferic into modal components, but rather propagates the sferic's electric and magnetic fields explicitly.

Lightning is a random event, but occurs at a high rate globally. The rate of lightning strikes exhibits seasonal and diurnal variations. For example, late afternoon in the summer months is ripe for high lightning rates. Past field campaigns have been scheduled during the summer to take advantage of the increased activity. On average there are more than 300 lightning strikes per minute. However, because the pulses are short enough, individual sferics are easily isolated in the measured VLF signals.

Sferics possess distinctive properties in both the time and frequency domain. In the time domain their temporal duration is about 10 milliseconds (ms, 1 ms=$10^{-3}$ seconds) with an initial strong pulse of about 2 ms, followed by a decaying tail, as depicted in more detail in later sections. In the frequency domain, also depicted in more detail in a later section, sferics' spectral signature includes a broad-band impulse, with a lower frequency cutoff around 1.8 kHz. Sferics, in nighttime propagation conditions, have an extreme low electromagnetic frequency (ELF) tail that exhibits a backward-J-shaped hook, or 'tweaks', in the extremely low frequency (ELF) band. The characteristics of sferics are used to separate these pulses from other components of VLF electromagnetic signals; and are summarized in Table 1.

TABLE 1

Characteristic electromagnetic properties of sferics.

| Property | Value |
| --- | --- |
| EM frequency band (kiloHertz, kHz) | 3 kHz-30 kHz |
| wavelength at 24 kHz (kilometers, km) | 12.5 km |
| duration (milliseconds, ms) | 2.5 ms |
| peak frequency | 9.05 kHz |
| magnetic field amplitude (picoTesla, pT) | >10 pT |
| average signal to noise ratio (in dB, 1 dB = 10 log of the ratio of signal power to noise power) | 16.5 dB |
| mean time between sferics (milliseconds) | 200 ms |
| appropriate EM field sampling rate (kilo samples, kS, per second, s) | 100 kS/s |

2. SYSTEM OVERVIEW

FIG. 1C is a diagram 130 that illustrates an example use of a lightning induced electromagnetic pulse as a source for probing an underground structure, according to an embodiment. For purposes of illustration, the ground is assumed to be flat with a ground-air interface 111. An anomaly in electrical conductivity or magnetic permittivity is assumed to occur in subsurface structure 132. A direction of propagation of a pulse is indicated as a dashed line 140a or 140b or 140c or 140d or 140e or 140f, collectively referenced hereinafter as propagation path 140. In some embodiments, the propagation path 140 can be inferred from a delay in traversing the distance from a first VLF receiver 150a to a second VLF receiver 150b, collectively referenced hereinafter as VLF receivers 150. This delay can be detected as a phase shift between a vertical propagation path, e.g., path 140f and a direct path 140a.

That is, the response of underground geological structure 132 to the illuminating sferics 140 is delayed in time with respect to the sferics' TM or TE pulse 140a propagating in the earth-ionosphere waveguide. This delay is conceptually the round-trip time for the wave to penetrate from the earth's surface to the underground structure(s), and return to the surface. Even though at the speed of light in the underground material the round-trip time is small, typically less than 1 microsecond (μs, 1 μs=$10^{-6}$ seconds), this delay introduces a phase shift in the response that is easily measured. Thus, in some embodiments, the VLF receivers 150 incorporate a high precision, Global Positioning System (GPS) based time reference, with an accuracy of better than 20 nanoseconds (ns, 1 ns=$10^{-9}$ seconds). Thus, delays in the VLF signals have at least that precision. By averaging the response over all samples in the sferic, even greater temporal precision is achieved in some embodiments. Thus the phase shift of the response is determined by comparing the response in a horizontal antenna that detects path 140a with the signal from a vertical antenna, e.g., that detects path 140f. This comparison is typically performed in the frequency domain via Fourier transform, where the phase between horizontal and vertical spectra is just the product of one with the complex conjugate of the other. Then using the Fourier phase shift theorem (see, e.g., Bracewell, 2001), the phase shift in the frequency domain is converted to the delay in the time domain.

In some embodiments, the vertical propagation path is inferred from the vertical component of the magnetic field at one or more VLF receivers, and the delay is neither determined nor used.

FIG. 1D is a diagram 160 that illustrates an example use of multiple lightning induced electromagnetic pulses (sferics) as a distributed horizontal source 170 for probing an underground structure 132, according to an embodiment. The horizontal axis 162 is distance in the east (x) direction. The vertical axis 164 is distance in the north (y) direction. The axes cross at a center of the underground structure 132. A centerline 182 passes through the center of the structure 132 in a direction of a major axis of the structure 132. The distance D 186 represents the distance from the centerline 182 to a receiving VLF receiver 150b. A horizontal direction of propagation of a pulse is indicated as a dashed line 170a or 170b or 170c or 170d or 170e or 170f or 170g, collectively referenced hereinafter as horizontal path 170.

Over the course of a few minutes, sferics arrive at VLF receiver 150b from a large variety of directions. As described in more detail below, the horizontal path can be inferred from the relative phase of the signals in the north south (NS) sensitive antenna loop and the east-west (EW) sensitive antenna loop. Given the direction, e.g., the direction of path 170d, one of the VLF receivers 150a is approximately upstream of the VLF receiver 150b. The property of the structure 132 along this path, e.g., along path 170d, is inferred from the vertical arrivals at VLF receiver 150b compared to the sferic at the upstream VLF receiver 150a. Similarly, the property of the structure 132 along other horizontal paths 170 are inferred from the vertical arrivals at VLF receiver 150b compared to the properties of the sferic at the upstream VLF receivers 150*a* on those paths 170. Information from all available horizontal and vertical paths are used to most completely describe the underground structure 132, e.g., by applying methods of computer tomography. This produces a fan of paths 170 that can be inverted using techniques of computer tomography in a process called fan-beam tomography.

In other embodiments, the incident and scattered fields at individual VLF receivers are used to deduce subsurface structure, and measured fields are decomposed into estimated incident and scattered components, with much of the vertically propagating fields assigned to the scattered component. An inversion approach, such as the Born approximation described below, is then used to deduce one or more properties of the underground structure.

In some embodiments, each sferic measurement has an associated delay, the delays are sorted into ranges that correspond to different depths. For example, in some embodiments, sferics are classified by sorting the delays into bins that are about 100 nanoseconds apart. This classification corresponds to depths that are material dependent, but roughly about 30 meters (m) each. This classification produces a set of azimuthal profiles, each profile associated with a particular depth. Then for each depth and using the azimuthal coverage of all the fan-beam projections at that depth, and the average changes in the amplitude of the sferics' response as the projection's response, the tomography is inferred by inversion, e.g., via the modified projection-slice theorem of Horn (1979). This inversion thus produces a tomographic slice at each of the depth bins, the collection of which is the full 3D image of the underground structure(s).

In other embodiments, the inversion is based on optimization techniques. In these techniques, an initial distribution of underground properties is determined and used to model the resulting scattered field. This scattered field is compared to an observed field and the properties of the underground structure are adjusted to minimize the difference. For example, the Born approximation is used to deduce the changes in the underground structure to reduce the difference between the computed and observed scattered fields.

Figure 2:
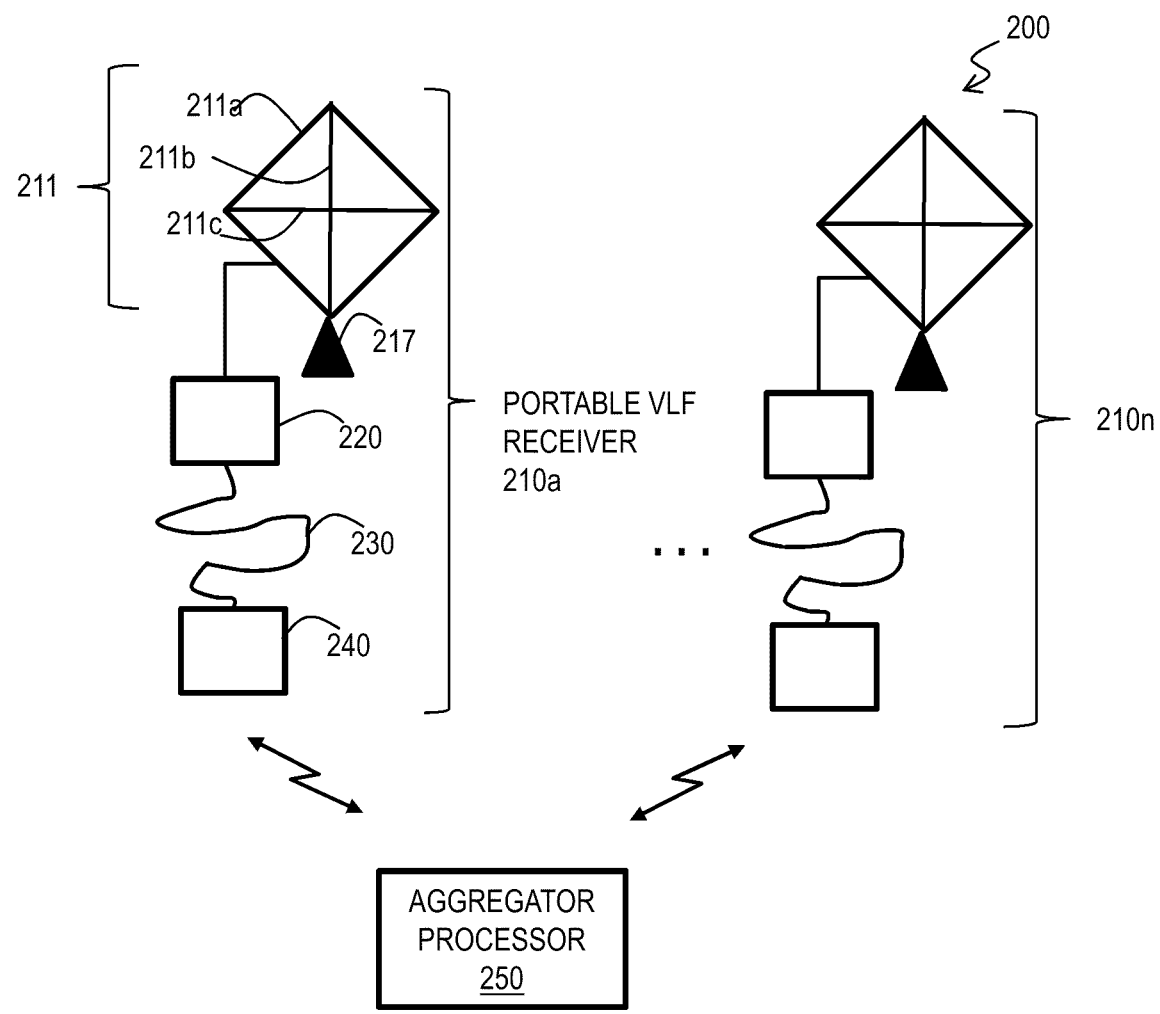
FIG. 2 is a block diagram that illustrates an example system for mapping an underground structure based on measurements of lightning induced electromagnetic pulses, according to an embodiment.

FIG. 2 is a block diagram that illustrates an example system 200 for mapping an underground structure based on measurements of lightning induced electromagnetic pulses, according to an embodiment. The system 200 includes a plurality of portable VLF receivers 210*a* through 210*n*, collectively referenced hereinafter as portable VLF receivers 210, and an aggregator processor 250, that combines information from all VLF receivers 210 to infer one or more properties of an underground structure, e.g., structure 132.

Each portable VLF receiver 210 includes an antenna 211 with three perpendicular loops 211*a*, 211*b* and 211*c* in which voltages are induced based on changing magnetic fields in three perpendicular directions. A transverse magnetic field vector component (e.g, east-west, EW, or x component) in one horizontal direction is detected by loop 211*a*; and a transverse magnetic field vector component in the perpendicular horizontal direction (e.g., north-south NS, or y component) is detected by loop 211*b*. A transverse magnetic field vector component in the vertical direction is detected by horizontal loop 211*c*. Each portable VLF receiver 210 includes a tripod 217 configured to allow the loops of antenna 211 to be properly oriented.

To capture these three channels of induced voltages without emitting VLF EM radiation that will be picked up by the antenna 211, a low noise amplifier 220 is included as a preamp to minimally boost a signal sent via cable 230 to a local processor and transmitter 240. At processor-transmitter 240, out of range of the antenna 211, the signal is further amplified and transmitted to the aggregator processor 250. In some embodiments, the local processor-transmitter 240 further operates to convert an analog signal to a digital signal before transmission.

In various embodiments, the aggregator processor 250 collects data from all three channels of each portable VLF receiver 210 and detects sferics, determines properties such as direction and amplitude and depth classification of each sferic, and infers one or more properties of an underground structure, such as conductivity change or permittivity change, or horizontal location, vertical location, horizontal extent or vertical extent of the anomalous conductivity or permittivity, or some combination.

FIG. 3A is a flow diagram that illustrates an example method 300 for mapping an underground structure based on measurements of lightning induced electromagnetic pulses, according to an embodiment. Although steps are shown in FIG. 3 as integral blocks in a particular order for purposes of illustration, in other embodiments, one or more steps or portions thereof are performed in a different order, or overlapping in time, in series or in parallel, or are omitted, or one or more additional steps are added, or the method is changed in some combination of ways.

In step 301, multiple VLF receivers are positioned to bracket a geographic region of interest (ROI) to map any underground structure in the vicinity. For example, eight VLF receivers 150 are distributed as depicted in FIG. 1D. In some embodiments, one or more of the VLF receivers are the portable VLF receivers 210 depicted in FIG. 2. In other embodiments, more or fewer VLF receivers are positioned. Configurations using 2, 3 5, and 12 VLF receivers have been run. In a given site of interest, these receivers often remain in location for two to three days for recording. The receivers are not moved during this time. When the receivers are set up, they are often set up within 500 meters of each other, usually in a ring-like configuration around the region of interest. It is the goal of the project to image the subsurface conductivity and permittivity within about 1000 meters of the receivers set up in the field. For example, in some embodiments, three VLF receivers are positioned about 200 meters apart in a geographic ROI, as depicted and described in more detail below with reference to FIG. 11A.

In step 303, signals from the VLF receivers are calibrated and conditioned. For example, voltages or currents measured in each electrically conducting loop are converted to magnetic field strength based on response curves established for each receiver. This is done so that field strengths measured at different receivers can be compared directly.

In step 311, it is determined whether an EM pulse is measured at a VLF receiver which is characterized as a sferic, e.g., satisfies one or more of the properties listed in Table 1, above. If so, then in step 313, the direction of propagation of the sferic is determined, e.g., by the relative phase of signals on the EW and NS channels for the receiver.

In step 315, based on the direction determined in step 313, an upstream VLF receiver and a downstream VLF receiver are identified. For example, based on a direction parallel to horizontal path 170*d* detected at VLF receiver 150*b*, the upstream VLF receiver 150*a* through which path 170*d* passes is identified as the upstream receiver and VLF 150*b* is identified as the downstream VLF receiver.

In step 317, the depth class of the sferic is determined. For example, based on the delay between the arrival of a sferic ground wave on path 140*a* to VLF receiver 150*b* and the vertical arrival of a later sferic, e.g., 140*f*, at VLF 150*b*, the depth class of path 140f is determined to be associated with the sferic detected in step 311.

If a sferic is not detected in step 311, or after step 317 if a sferic is detected, then control passes to step 321. In step 321, it is determined whether there is sufficient data to infer one or more properties of a subsurface structure. For example, it is determined whether there are ten or more sferics recorded in each of the five depth classifications depicted in FIG. 1C for each of seven horizontal directions depicted in FIG. 1D.

If not, then control passes to step 331 to determine whether conditions are satisfied for ending the process, e.g., that a given data accumulation time has expired or a subsurface mapping has already been successfully provided. If end conditions are satisfied, then the process ends. Otherwise, control passes back to step 303 to calibrate and condition new VLF signals received at each VLF receiver.

If it is determined, in step 321, that there is sufficient data to infer one or more properties of a subsurface structure, then control passes to step 323. In step 323 the change of sferic properties due to propagation or backscatter, or both, is determined for each of one or more horizontal direction ranges for each of one or more depth classifications.

In step 325, the observed changes in sferic properties are used with a model of sferic propagation or scattering, or both, or an inversion algorithm, such as for computer tomography, or some combination, to deduce one or more properties of a subsurface structure in the vicinity of the VLF receivers. For example, the location or spatial extent of an anomaly or the conductivity or permittivity change associated with the anomaly, or some combination is determined. Any model or inversion method may be used. In some embodiments, described in more detail in a later section, a Born Approximation formulation is used.

In step 327 a description of one or more properties of the subsurface structure is presented. For example, a graph of inferred conductivity variations is presented, as depicted and described in more detail below with reference to FIG. 13A. In some embodiments, a graph of inferred permittivity variations is presented, as depicted and described in more detail below with reference to FIG. 14A.

FIG. 3B is a flow diagram that illustrates an example method 350 for mapping an underground structure based on measurements of lightning induced electromagnetic pulses, according to another embodiment. In method 350, steps 301, 303, 311, 327 and 331 are as described above for method 300.

If a sferic is detected in step 311, then in step 353 the direction is determined and an incident waveform is estimated, e.g., based on the horizontal components.

In step 355 a current model of the subsurface structure and the estimate of the incident waveform are used with a partial differential equation (PDE) form of Maxwell's equation to compute a scattered field. The computed scattered field is compared to an observed scattered field based on the measured field and the estimate of the incident field. An optimization method is used to estimate the corrections to the current model of the subsurface structure. This step is called partial-differential equation (PDE) constrained optimization. For example, the Born approximation is used to infer the corrections to the current model of the subsurface structure.

In step 357, a material profile is updated to indicate the corrected current model of the subsurface structure.

In step 361 it is determined if the update material profile has converged on a stable result, e.g., successive updates have changed the profile by a very small percentage amount in opposite directions. If so, control passes to step 327, described above, to present the results. If not, then control passes to step 331, described above, to determine if end conditions are satisfied.

3. DATA COLLECTION EQUIPMENT

In step 301 VLF receivers are deployed. The sferic EMP's are recorded in an ensemble of Stanford University designed and constructed portable VLF Radio Receivers based on the Stanford AWESOME VLF Receiver, itself a product of Stanford's VLF Group (Cohen et al., 2010). Each portable VLF Receiver is capable of converting a sferic's EM pulse into voltages proportional to the EM field strengths via a three-axis set of antenna loops, each loop at right angles to the others.

Figure 4A:
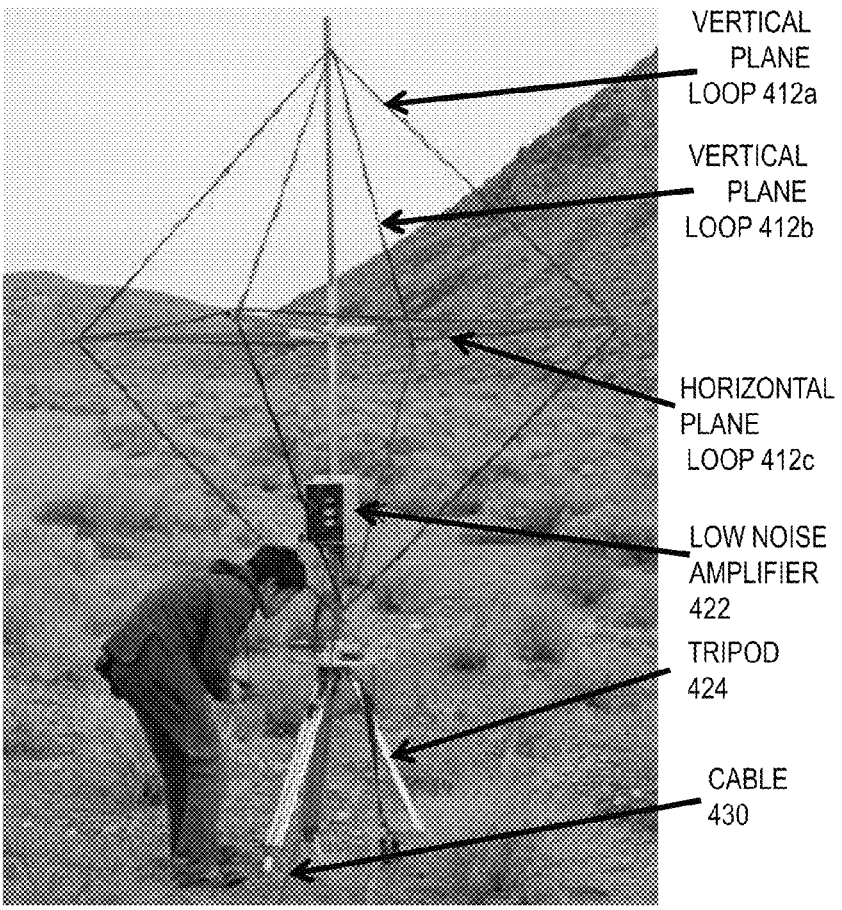
FIG. 4A is a photograph that illustrates an example first portion of a VLF electromagnetic receiver, according to an embodiment.

FIG. 4A is a photograph that illustrates an example first portion of a VLF electromagnetic receiver, according to an embodiment. The first portion includes a VLF antenna 410, a low noise amplifier 422 serving as the pre-amp, a tripod 424 and a cable 430. The VLF antenna 410 includes a first vertical plane loop 412a, a second vertical plane loop 412b and a horizontal plane loop 412c. Antenna 410 and loops 412a, 412b, 412c constitutes a particular embodiment of the antenna 211 and loops 211a, 211b, 211c, respectively, depicted in FIG. 2. Each loop of the VLF Portable Receiver's VLF antenna is wound on a square aperture, 1.6-meters on a side, with 14 turns of 18-gauge wire. The loops were wound in this manner to have a total resistance of 1.0 ohms, and an inductance of 1.0 milliHenry (mH, 1 mH=$10^{-3}$ Henry). The resistance and inductance of the loops, chosen to match the input impedance of the VLF preamplifiers, affords an optimum sensitivity for the receivers. The three loops are arranged in a tri-axial, mutually orthogonal geometry, and attached to the mount of a surveyor's tripod 424. The tripod provides both the elevation needed for the loops above the ground, as well as adjustments needed to trim the orientation of the antenna planes to North-South and East-West for the vertical planes, and horizon-level for the horizontal plane. In some embodiments, three guy-wires sustain the antenna in the desired orientation.

The inter-receiver variance of the transverse magnetic field (parallel to the surface of the earth) of a single sferic is generally very small from station to station. However the vertical magnetic field (orthogonal to the surface of the earth) can vary substantially. The variability of the vertical magnetic field is suspected to be due to scattering from subsurface conductivity and permittivity anomalies and variation in surface topography. However, small misalignments of this loop can cause large changes in the signal as the transverse magnetic fields are stronger than the vertical magnetic field; thus a small error in antenna alignment can mask scattered fields in the vertical magnetic field. Thus in some embodiments, the alignment of the horizontal loop is important.

In the illustrated embodiment, the voltages from the antenna loops 412a, 412b, 412c are amplified by a three-channel preamp 422 with exceptional performance, wherein each particular channel has a dynamic range in excess of 90 deciBels (dB, 1 dB=10 log of a ratio of signal strengths), and each channel's noise level is at least 50 dB below the VLF levels from natural processes in the earth's ionosphere and magnetosphere. In the illustrated embodiment, the preamplifier 422 box is mounted directly on the antenna mast. Inside the preamplifier box are three channels of low noise amplifiers (LNAs), with each channel on a separate board with the LNA and a line driver capable of driving a 100 meter Belden cable 430 that allows the preamplifiers to be separated from the back-end digitizer and laptop-based data acquisition system 240. Each LNA has a large dynamic range of greater than 90 dB, and a sensitivity such that a VLF wave with a magnetic amplitude of 0.1 picoTesla (pT, 1 pT=$10^{-9}$ Tesla), arriving at an antenna loop at normal incidence induces a voltage that is comparable to the LNA's noise floor of 10 nanoVolts per root-Hz (nV/root-Hz, 1 nV=$10^{-12}$ volts, root-Hz=square root of one Hertz). The LNA's output is further amplified such that the total gain for the preamplifier stage is 60 dB. The preamplifier box additionally contains a calibration circuit that injects a comb of frequencies of known amplitude into the LNA input network. The calibration tone injection is manual, with a button inside the preamp box that is pushed and held to turn on the calibration.

The amplified signals from the preamp 422 are driven by three line drivers onto a 100 meter (m) cable 430, the other end of which is connected to a digitizer and data acquisition system 240. The cable 430 is a particular embodiment of the cable 230 depicted in FIG. 2. This cable 230 allows the antenna 410 and preamp 422 to be separated by about 100 m, and effectively isolates the high sensitivity receiver's front end 410 and 422 from the relatively noisy processor-transmitter 240, called herein the back-end of the digital data collection system.

Figure 4B:
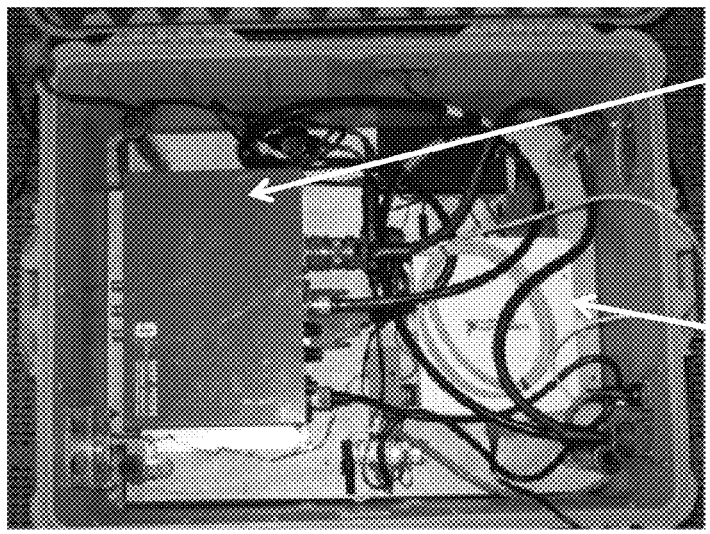
FIG. 4B is a photograph that illustrates an example second portion of a VLF electromagnetic receiver, according to an embodiment.

FIG. 4B is a photograph that illustrates an example second portion of a VLF electromagnetic receiver, according to an embodiment. The second portion includes a three channel line receiver 442 and multichannel analog to digital (A/D) converter (ADC) 444 of the back end 240 of the digital data collection system, both disposed in a portable Pelican case 440 with custom shelving.

The three channel line receiver 442 has the three line receivers that match the impedance of the Belden cable 430. The output of each line receiver connects to an anti-aliasing filter with a cutoff of 40 kHz, to permit Nyquist sampling at a rate of 100 kS/s for each channel. These filters additionally have a direct current (DC) block to suppress frequencies below 100 Hz, and thereby reduce contamination from the 60 Hz power line harmonics. Precision timing for the Portable VLF Receiver 210 is obtained from a GPS timing module mounted in the three channel line receiver 442. The GPS unit connects to a GPS cone antenna (not shown) externally mounted on a small mast (not shown) anchored close to the Pelican case 440. Care is taken in placing the GPS external antenna to have sufficient open sky that at least six GPS satellites are visible at any time.

The ADC 444 digitizes each of the three channels received on line receiver 442 to 16-bits at a sample rate of 100 kS/s per channel. In the illustrated embodiment, the ADC 444 is a National Instrument digitizer (NIDAQ A/D). The reference frequency, a 100 kHz sample clock, is derived from a GPS timing module located in the three channel line receiver 442. The digitizer 444 samples the three input channels, EW, NS, and AUX (where the AUX channel is the signal from the horizontal magnetic loop antenna) at 100 kS/s each, although the sample time for each channel is offset by about 2.5 microseconds (μs, 1 μs=$10^{-6}$ seconds). The exact time offsets are determined using the calibration procedure described below.

The Pelican case 440 is fitted with external connectors for the Belden cable 430, GPS antenna (not shown) and 12 Volt direct current (DC) power supply (not shown), two cooling ports, one fan driven with a variable speed, temperature sensing controller. The Pelican case 440 has two custom fitted shelves. The bottom shelf houses the line receiver 442 together with the ADC 444, and laptop computer's DC to DC converter. The top shelf holds a laptop computer.

Figure 4C:
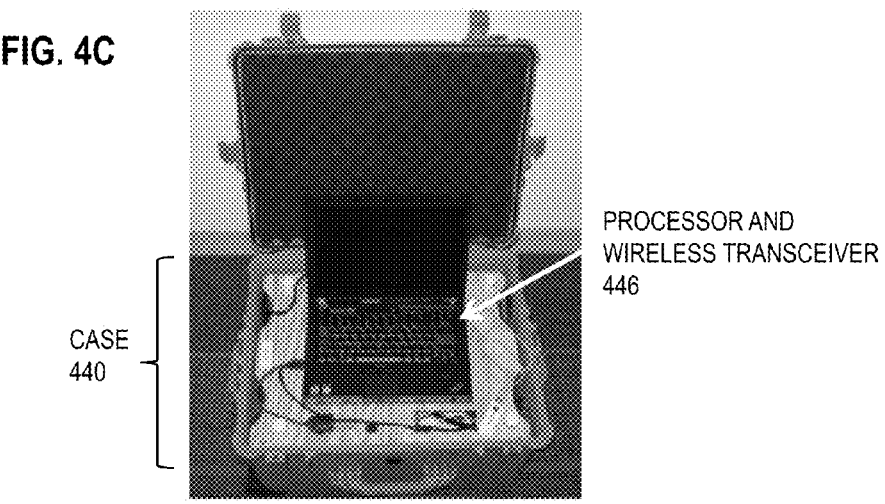
FIG. 4C is a photograph that illustrates an example third portion of a VLF electromagnetic receiver, according to an embodiment.

FIG. 4C is a photograph that illustrates an example third portion of a VLF electromagnetic receiver, according to an embodiment. The third portion includes the laptop computer that serves as the data processor wireless transceiver 446 in portable carry case 440. The digital data samples from the ADC 444 are stored on the hard drive of the laptop computer which functions as a command and control interface of the data acquisition back end 240. The ADC 444 connects to the laptop computer though a USB interface. The data acquisition is synchronized to an external frequency reference provided by an accompanying GPS clock (not shown) in line receiver 442 inside case 440. The GPS clock obtains its high precision timing from the GPS constellation and an L-band antenna mounted separately near the case 440 of the back-end system 240. The GPS timing module has a serial interface to the laptop computer that reports status. The laptop's control software requires the GPS timing module to have found sufficient satellites to lock and stabilize the 100 kHz reference clock it produces. In addition, the GPS timing module produces a 1 pulse per second (pps), reference that the laptop's control software requires to maintain data acquisition.

The command and control interface for the back-end system 240 runs on the laptop computer with the additional capability for remote wireless access. The wireless service takes advantage of standard wireless protocols and hardware components supported by the laptop, together with an external high gain wireless antenna (not shown), itself separately mounted near the data acquisition system's back-end in case 440. When the Portable VLF receivers 210 are operating they are typically located about 1 km or more from each other. For example, in some embodiments, the portable VLF receivers 210 are arranged in an approximate circle, 12 km in circumference. To insure that all systems are running and acquiring data correctly, a remote-access wireless service is included in each portable VLF receiver 210. This service takes advantage of the wireless hardware and driver included in the laptop computer, and augmented by an external high gain wireless-band antenna. This external antenna is co-located on the GPS antenna mast.

In the illustrated embodiment, each portable VLF receiver 210 is powered by a deep-cycle 100 ampere-hour marine 12 Volt DC battery To provide full coverage of the portable systems, a wireless base station serves as the aggregator processor module 250. In an example embodiment the aggregator processor module 250 is located near the center of a circle inscribed by the twelve portable VLF receivers 210. The base station module 250 consists of a laptop computer interfaced to a wireless router and wireless-band amplifier itself connected to a high-gain wireless-band antenna. With this arrangement, a single operator at the base station 250 can interrogate the status of all twelve systems as well as transfer data; and thereby verify that the full system is operational and performing up to expectations.

Figure 5A:
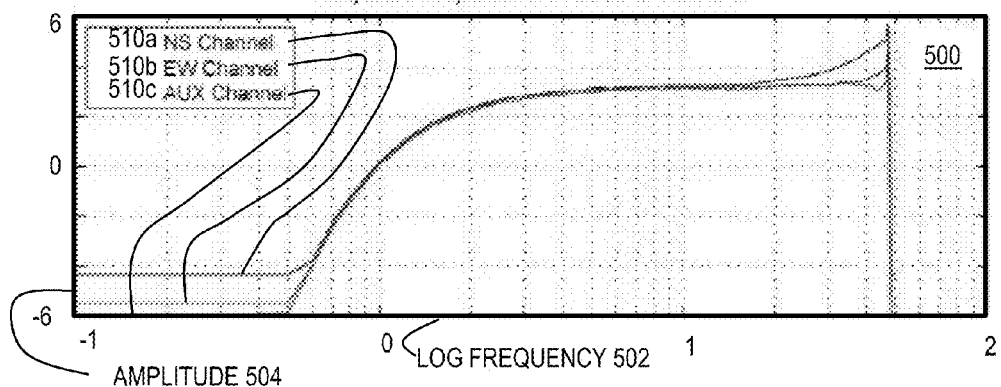
FIG. 5A is a graph that illustrates an example family of amplitude response curves for a VLF receiver, according to an embodiment.
Figure 5B:
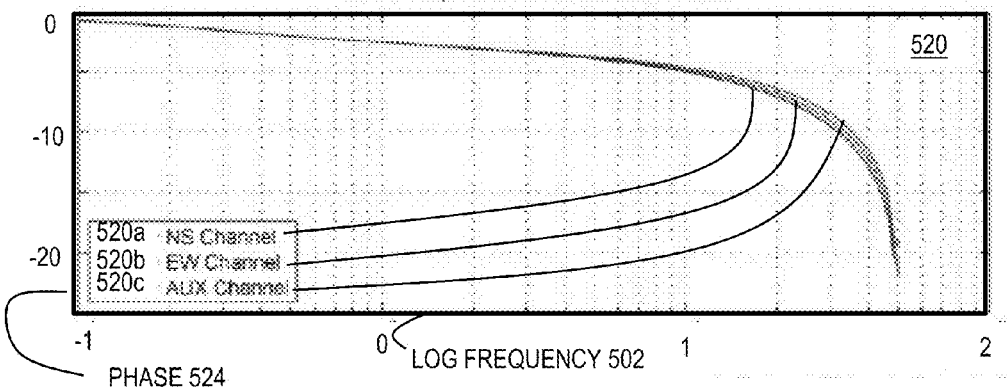
FIG. 5B is a graph that illustrates an example family of phase response curves for a VLF receiver, according to an embodiment.

The end-to-end response of the Portable VLF Receiver is shown in FIG. 5A and FIG. 5B, for all three channels. FIG. 5A is a graph 500 that illustrates an example family of amplitude response curves for a VLF receiver, according to an embodiment. The horizontal axis 502 is logarithm (base 10) of frequency; and the vertical axis 504 is amplitude in dB. Trace 510a depicts the response to a horizontal signal on the NS loop; trace 510b depicts the response to a horizontal signal on the EW loop; and 510c depicts the response to a vertical signal on the horizontal loop. FIG. 5B is a graph 520 that illustrates an example family of phase response curves for a VLF receiver, according to an embodiment. The horizontal axis 502 is logarithm (base 10) of frequency; and the vertical axis 504 is phase in radians. Trace 520a depicts the response to a horizontal signal on the NS loop; trace 520b depicts the response to a horizontal signal on the EW loop; and 520c depicts the response to a vertical signal on the horizontal loop.

Both the frequency response graph 500 and the phase profile graph 520 have been measured in the manner of a network analyzer by sweeping a reference tone from 0.1 Hz to 50 kHz, digitizing the receiver's response and processing the resultant samples off-line to compute the spectrum and phase profile. All three channels of the receiver's response are presented.

4. MEASUREMENT CONDITIONING

Measurement conditioning during step 303 includes: calibration and equalization; removal of 60-Hz power line harmonics; and removal of VLF Transmitter signals. These steps are performed to remove distortions in the receiver and contamination due to known sources of interference.

During calibration and channel equalization, the channel gains and phase shifts (depicted in FIG. 5A and FIG. 5B, for example) are measured and compensated such that all three channels in each receiver have uniform performance. The receiver hardware is designed to operate as a linear time invariant (LTI) system. Therefore, the receiver's effect on the recorded signals can be completely described by a transfer function that consists of a magnitude and phase response for its entire frequency range. Since a 100 kHz sampling frequency is used, the system as a whole is limited to knowledge of signals from DC to 50 kHz. Filters in the hardware limit signals at both the low end and at the high end (anti-aliasing). By precisely measuring the phase and amplitude response of the entire system to a calibrator, a transfer function and its inverse is determined for each channel in each system that compensates for cable length, component variability, and internal sampler delays. This calibration procedure also converts the raw ADC values, e.g., in volts, to physical values of magnetic field strength, e.g., in picoTesla.

An example of the calibration effect is shown as waveforms before and after calibration for a single strong sferic in FIG. 5C and FIG. 5D, respectively. Thus, FIG. 5C and FIG. 5D are graphs 540 and 560, respectively, which illustrate an example of calibrating and conditioning a VLF signal that includes a sferic pulse, according to an embodiment. The identical horizontals axes 542 are time in microseconds (□s). The vertical axis 544 for graph 540 is amplitude in ADC voltage. Trace 550a depicts the uncalibrated response to a horizontal signal on the NS loop; trace 550b depicts the uncalibrated response to a horizontal signal on the EW loop; and 550c depicts the uncalibrated response to a vertical signal on the horizontal loop. While the characteristic initial impulse (successive large peaks) and low frequency tail of a sferic are apparent in the uncalibrated traces 550a, 550b, 550c, a persistent difference among the traces is seen between about 300 and 1000 □s (0.3 to 1 ms).

The vertical axis 564 for graph 560 is amplitude of VLF magnetic field in picoTesla (pT). Trace 570a depicts the calibrated response to a horizontal signal on the NS loop; trace 570b depicts the calibrated response to a horizontal signal on the EW loop; and 570c depicts the calibrated response to a vertical signal on the horizontal loop. The inverted relationship between traces on the top graph 540 and bottom graph 560 is due to an inverting amplifier in the preamplifier's LNA. Because the phase compensation equalizes effects such as this, the compensated waveforms have opposite polarity to the uncompensated waveforms. The persistent difference among the traces 550a, 550b, 550c has been eliminated among traces 570a, 570b and 570c in the time interval from 300 and 1000 □s (0.3 to 1 ms). Thus traces 570a, 570b, 570c can be compared directly to corresponding calibrated traces at other VLF receivers.

The next step is intended to remove the contaminations from the 60-Hz power line harmonics; and, consists of filtering with a high-pass filter to exclude the 60-Hz harmonics below 1.5 kHz. In other embodiments, e.g., in countries with 50-Hz power lines, the harmonics of the different power line frequency are removed below 1.5 kHz. Since propagation of the sferics' EMP in the earth-ionosphere waveguide experiences a low frequency cutoff at 1.5 kHz, little of the sferic's energy remains in this band after propagating for distances in excess of 1000 km. Thus it has little impact on the sferic's waveforms to high-pass filter them with a 1.5 kHz cutoff. Selecting sferics that come from storms at 1000 km distance and more is desirable, for these sferics have become almost fully transverse polarized, a property which is valuable for their use in geological imaging.

Typically, three to four known VLF transmitters are the main source of residual contamination of the sferic waveforms after the 60-Hz harmonics exclusion. Thus the next step removes the signals of these VLF transmitter in the time domain. VLF transmitters broadcast using minimum-shift keying (MSK) modulation, at a frequency close to 24 kHz. For example, the broadcast frequencies of the three VLF transmitters in North America are: NML 25.2 kHz (North Dakota); NLK 24.8 kHz (Washington); and NAA 24.0 kHz (Maine). Using a procedure described in U.S. patent application Ser. No. 12/152,232, the entire contents of which are hereby incorporated by reference as if fully set forth herein, the signal from these transmitters is isolated and subtracted directly from the data in a manner designed to minimize modification of sferic waveforms. Care is taken to remove the fully modulated signal from the data. Typically 99% of the original transmitter power is removed from the samples in each of the three receiver channels.

5. SFERIC ARRIVAL STRUCTURE RECONSTRUCTION

In the field, sampling proceeds continuously and uninterrupted for 24 hour periods, collecting 51 gigBytes (gB, 1 gB=$10^9$ bytes, 1 byte=8 binary digits, bits) of data per site per day.

Once the time sequences have been cleared of the 60-Hz power line harmonics and the VLF transmitters, the time-domain samples are scanned for the sferics in step 311. For example, a simple sferic detection algorithm is run that first estimates the standard deviation (STD) of the background noise exclusive of the sferics. This STD estimate is found by first computing the STD of the fluctuations in all the time samples in a typical window of say 60 seconds, then all samples with absolute value greater than five STDs are excluded; and, the STD is recomputed. This process is repeated until the change in the current STD is less than 20% of the previous STD. At this point the STD is a close estimate of the fluctuations of the background noise exclusive of the sferics.

Using the background noise STD estimate, the time samples in the window are tested and all samples with absolute value greater than three times the STD are tagged. The tagged samples are then clustered and all samples within 2 ms of the largest sample in the cluster are associated with a candidate sferic. Next the total power of the candidates is computed by summing the squares of the candidate's samples minus the background estimate (the product of the STD and the number of candidate samples), and a signal-to-noise ratio (SNR) is estimated for the candidate by dividing the total power by the background estimate. The candidate-sferics are sorted according to their SNR's, and those sferics greater than a minimum SNR are retained for further analysis. The minimum SNR is typically chosen as about 20 dB.

Individual sferics can be tracked over great distances. In the data collected in the field, the majority of the energy of a sferic can be viewed in a 256 point window (2.56 ms) as in FIG. 5D. The sferic consists of two distinctive parts, an impulsive beginning and a weaker, longer duration ELF tail. This ELF tail (<1 kHz) can often extend beyond the 2.56 ms window, but has died out within 10 ms. The impulsive beginning of the sferic is easily distinguished in the data. These impulses have a signal to noise ratio of 16.5 dB. However, there are many in any given minute that can exceed 20 dB.

Figure 6A:
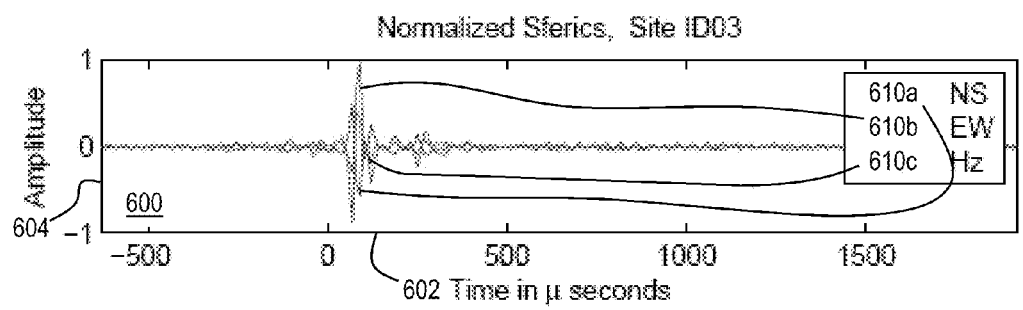
FIGS. 6A through 6C are graphs that illustrate the arrival of a particular sferic at multiple VLF receivers, according to an embodiment.
Figure 6B:
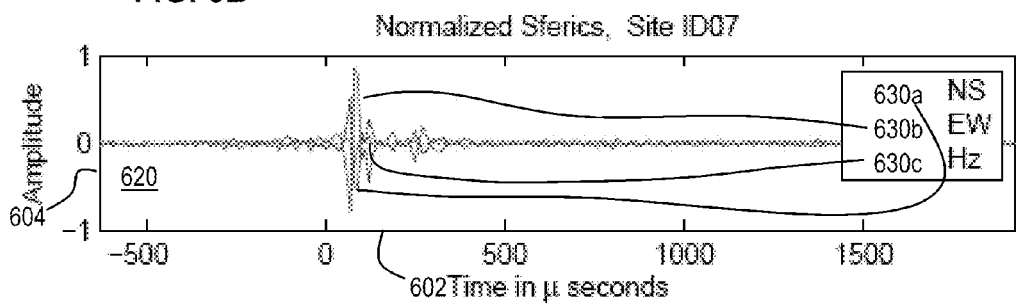
Figure 6C:
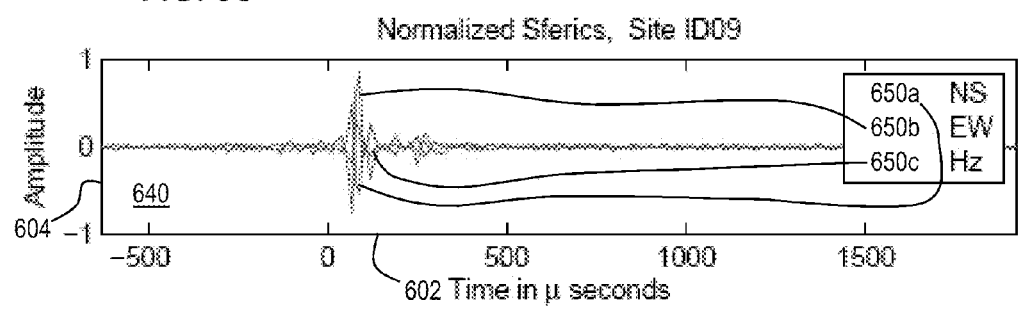

FIGS. 6A through 6C are graphs 600, 620 and 640, respectively, which illustrate the arrival of a particular sferic at multiple VLF receivers, according to an embodiment. The horizontal axis 602 is time in microseconds (µs) and is identical in all three graphs. The vertical axis 604 is amplitude in dB relative to background and is also identical in all three graphs. This one sferic was recorded during August 2009 on the three channels of each of three receivers in Idaho, designated ID03, ID07 and ID09 corresponding to graphs 600, 620 and 640, respectively. On the VLF receiver at the ID03 site, trace 610a depicts the calibrated response to a horizontal component of the sferic on the NS loop; trace 610b depicts the calibrated response to a horizontal component of the sferic on the EW loop; and trace 610c depicts the calibrated response to a vertical component of the sferic on the horizontal loop. Similarly, on the VLF receiver at the ID07 site, trace 630a depicts the calibrated response to a horizontal component of the sferic on the NS loop; trace 630b depicts the calibrated response to a horizontal component of the sferic on the EW loop; and trace 630c depicts the calibrated response to a vertical component of the sferic on the horizontal loop. On the VLF receiver at the ID09 site, trace 650a depicts the calibrated response to a horizontal component of the sferic on the NS loop; trace 650b depicts the calibrated response to a horizontal component of the sferic on the EW loop; and trace 650c depicts the calibrated response to a vertical component of the sferic on the horizontal loop. Each of the three components show similar structure to corresponding components during corresponding time intervals at all three sites, thus indicating the same sferic.

While the shape of any given sferic is unique, they all have a characteristic spectral shape illustrated in FIG. 7. FIG. 7 is a graph 700 that illustrates an example average electromagnetic frequency spectrum of thousands of detected sferic pulses, according to an embodiment. The horizontal axis 702 is frequency in kHz. The vertical axis 704 is amplitude in normalized units. Trace 710 depicts an average spectrum, with a peak near 9 kHz, as indicated in Table 1. The gap between 1 kHz and 5 kHz is a characteristic of the Earth ionosphere waveguide modes. Essentially the lowest frequencies (<1 kHz) propagate in a transverse electromagnetic (TEM) mode while the higher frequencies propagate predominantly in quasi-transverse magnetic (QTM) modes. The lower bound represents the cutoff characteristics of the waveguide.

FIG. 8 is a stack of graphs 810 through 850 that illustrates similarity of a detected sferic pulse as the sferic propagates over hundreds of kilometers, according to an embodiment. The horizontal axis 802 is time in microseconds (µs) and is identical in all five graphs. The vertical axis 804 is amplitude in picoTesla relative to background and is also identical in all five graphs. This one sferic was recorded on each of five receivers on a roughly 100 km rectangular array with one receiver in the center. These five sites are designated Cheney, Milford, Kanopolis, Glen Elder, Larned corresponding to graphs 810 through 850, respectively. On the VLF receivers at the five sites, traces 812, 822, 832, 842 and 852 depicts the calibrated response to a horizontal component of the same sferic. Cross correlation estimation is accurate to better than 0.05 microseconds, by using GPS time reference in each receiver. Precise measurement of group velocity of sferics is accomplished by comparing corresponding zero crossings of the same sferic at the different sites. The shape of this sferic appears unchanged on a scale of about 100 km.

In step 313, sferics are grouped into different horizontal path direction ranges. For example, selected sferics are classified according to the ellipticity of their polarization. The ellipticity is determined by projecting the time samples of the sferic's waveform onto a plane defined by the two orthogonal directions of the magnetic loop antenna, i.e. with the EW loop as the ordinate and the NS loop as the abscissa of the plane. In this plane, the time samples of each sferic's waveform typically circumscribes a thin ellipse in a lissajous pattern, where the direction of the ellipse's major axis is a good estimate of the direction of arrival for the sferic. Assuming for purposes of illustration that the sferic is propagating in TE mode, or TM mode, then voltages are induced in the magnetic loops at right angles to the direction of propagation.

Figure 9A:
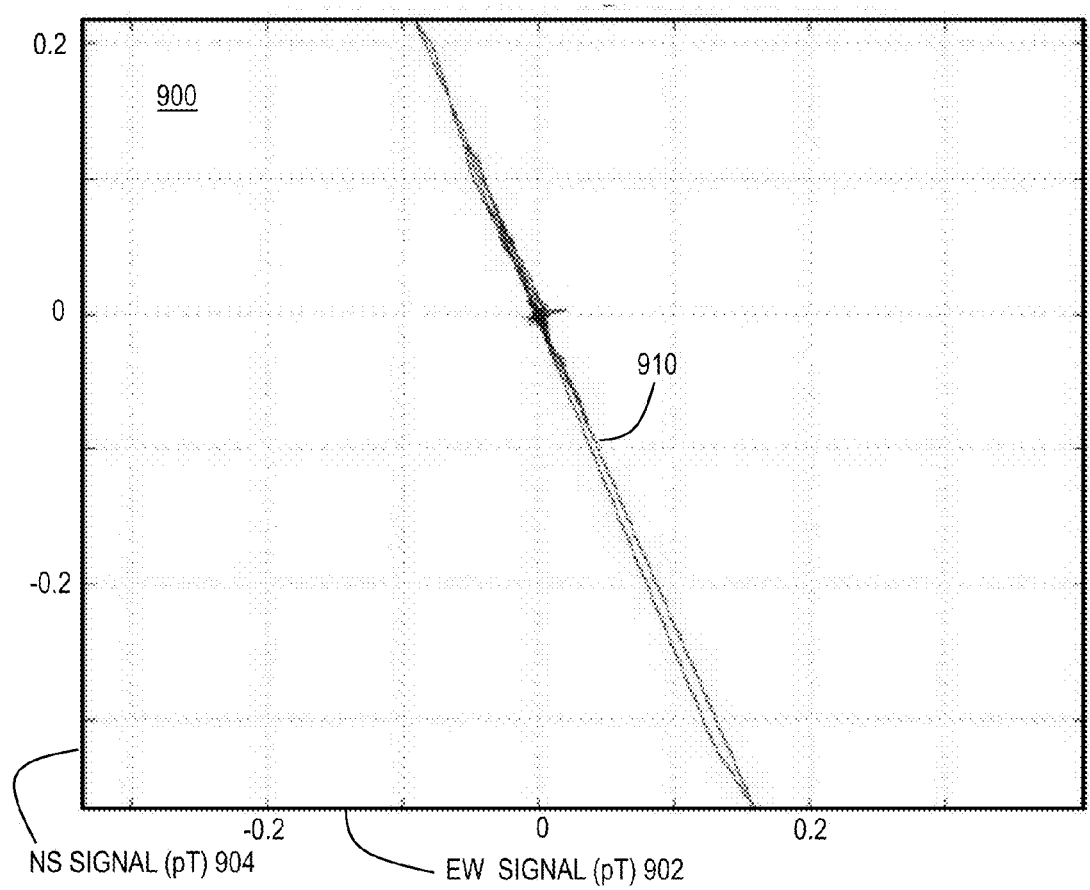
FIG. 9A is a graph that illustrates an example azimuthal direction of a sferic deduced from relative phase of a VLF frequency detected on a north-south loop of a VLF antenna compared to the phase detected on an east-west loop of the VLF antenna, according to an embodiment.

FIG. 9A is a graph 900 that illustrates an example azimuthal direction of a sferic deduced from relative phase of a VLF frequency detected on a north-south loop of a VLF antenna compared to the phase detected on a east-west loop of the VLF antenna, according to an embodiment. The horizontal axis 902 is signal strength in picoTesla on the east-west antenna loop; and vertical axis 904 is signal strength in picoTesla on the north-south antenna loop. The Trace 910 is a lissajous pattern compressed tightly and lying closely along a straight line. Direction is inferred at a single VLF receiver from the graphs such as 900, which indicates a sferic traveling to the southeast.

Figure 9B:
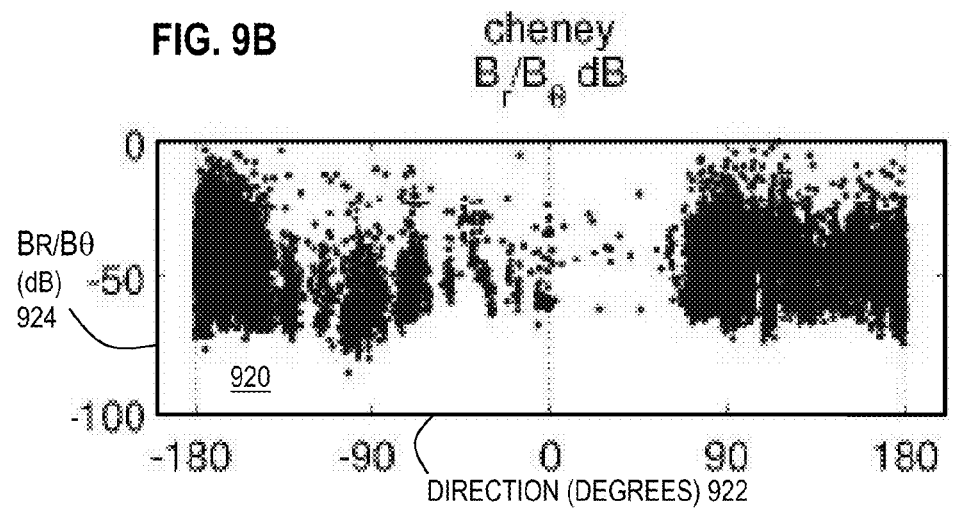
FIG. 9B is a graph that illustrates an example distribution of power ratios and directions of sferics detected at a single site over the course of a few minutes, according to an embodiment.

The log of the ratio of the ellipse's minor axis to its major axis is the ellipticity. Were there no ellipticity to the polarization of the sferic, then the lissajous pattern would lie entirely on a straight line. The irregularities in both the ionosphere's and earth's conductivities (the latter leading to the ability to infer underground structure changes), which break the symmetries in the simple waveguide model, result in the emergence of longitudinal components in the waveform of the sferic and is manifest as a non-zero ellipticity. FIG. 9A depicts a non-zero ellipticity. FIG. 9B is a graph 920 that illustrates an example distribution of power ratios and directions of sferics detected at a single site over the course of a few minutes, according to an embodiment The horizontal axis 922 is direction of propagation in degrees from north. The vertical axis 924 is ellipticity as the ratio of the length of the minor axis, $B_R$, to the major axis, $B_\Theta$, in dB. Each point represents sferic ellipticity and direction of arrival observed at one site. The graph 920 contains ellipticity and direction of arrival for about 1000 sferics, recorded continuously during a time interval of just a few minutes. The seemingly continuous swaths are actually a cluster of dots too close together to be individually distinguishable.

During step 315 the detected sferic is characterized by direction of propagation and ellipticity. Sferics are selected for direction of propagation through the geographic region of interest and for small ellipticity, thereby selecting those sferics that possess the highest degree of transverse polarization and are thus the best candidates for sources of illumination and mapping of underground geological structure.

Even with such strict selection there are sufficient numbers and types of sferics to serve as sources for tomographic exploration of a region of interest. In North America, an independent database from the National Lightning Detection Network (NLDN) provides time and location of individual lightning strikes. Since propagation in the earth ionosphere waveguide is subject to attenuation rates of a few dB per thousand kilometers, sferics from distant parts of the globe are considerably weaker than those within a 2000 km radius. A large fraction of the sferics observed in the field can be correlated with NLDN data, thus the location of the source is known.

Figure 10A:
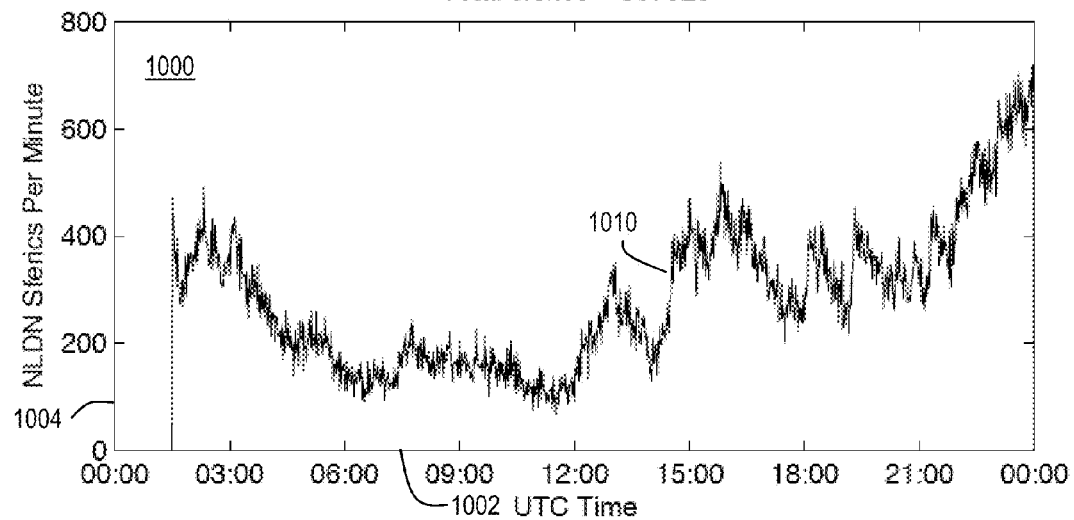
FIG. 10A is a graph that illustrates an example distribution of sferics per minute recorded at a national data center.

FIG. 10A is a graph 1000 that illustrates an example distribution of sferics per minute recorded at a national data center. The horizontal axis 1002 is time of day expressed in Coordinated Universal Time (UTC), a time standard based on International Atomic Time (TAI) with leap seconds added. The vertical axis 1004 is the number of NLDN lightning strikes per minute. Corresponding sferics can be found in the data recorded by VLF receivers in the field, thus the location of the source of such sferics is known within a kilometer of the exact location, often thousands of kilometers away. The gap from 00:00-01:30 simply represents a time interval during which data was not requested. During a 24 hour period, several thousand sferics can be observed from many different storms; thus, providing the sources distributed all around almost any region of interest.

Figure 10B:
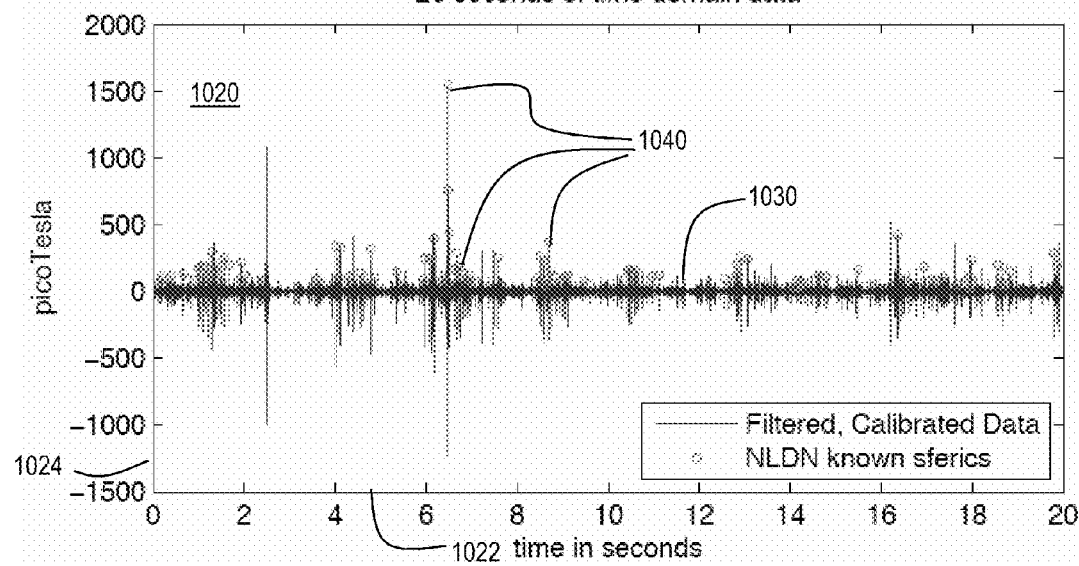
FIG. 10B is a graph that illustrates an example distribution of VLF electromagnetic pulses detected at a VLF receiver, according to an embodiment.

FIG. 10B is a graph 1020 that illustrates an example distribution of VLF electromagnetic pulses detected at a VLF receiver, according to an embodiment. The horizontal axis 1022 is time in seconds from a start of a recording. The vertical axis 1024 is the strength of VLF signals recorded in picoTesla. The trace 1030 indicates a 20 second clip of calibrated, filtered, time domain data from Idaho, during August 2009. Solid circles 1040 indicate sferics correlated with the NLDN database. A large fraction of the sferics observed in the field can be correlated with NLDN data, thus the locations of these sources are generally determinable.

Figure 11A:
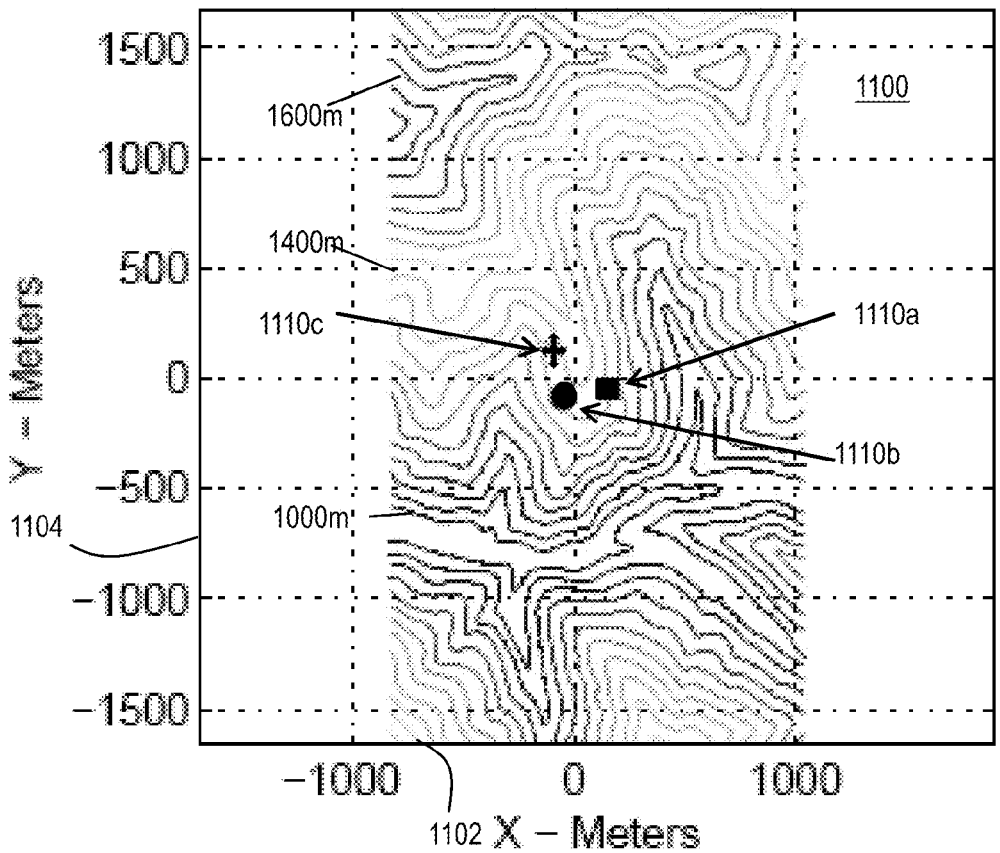
FIG. 11A is a map that illustrates positions of three VLF receivers relative to local topography, according to an embodiment.

When inferring properties of a subsurface structure using sferics, the local topography should be included. This is demonstrated for a three receiver setup from Northern Idaho, during August 2009, shown in FIG. 11A. FIG. 11A is a map that illustrates positions of three VLF receivers relative to local topography, according to an embodiment. The horizontal axis 1102 is x distance east in meters from a center point. The vertical axis 1104 is y distance north in meters from the center point. Contours of height range from a low of about 1000 meters elevation to a high near 1600 meters elevation. The positions 1110a, 1110b and 1110c of three VLF receivers on a ridge near the 1300 meter elevation contour are plotted.

Figure 11B:
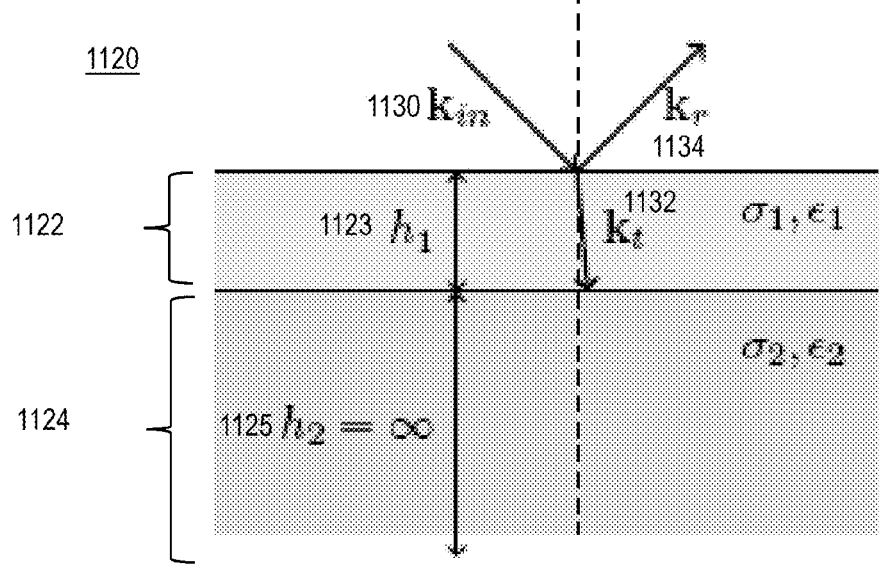
FIG. 11B is a diagram that illustrates an example two-layer model used to estimate the effects of local topography on VLF electromagnetic signals, according to an embodiment.

For example, a simple 1D layered earth model has been used to demonstrate that surface effects play an important role in field measurements and thus in the inversion methods employed. In other embodiments, more sophisticated models that capture more of the complete physical process are used during inversion. FIG. 11B is a diagram that illustrates an example two-layer model 1120 used to estimate the effects of local topography on VLF electromagnetic signals, according to an embodiment. The first layer 1122 extends from the ground surface to a depth 1123 (called h1). The conductivity and permittivity of the first layer are indicated by the symbols σ1 and ε1, respectively. The second layer 1124 extends from the first layer 1122 to a depth 1125 (called h2) set arbitrarily large. The conductivity and permittivity of the second layer are indicated by the symbols σ2 and ε2, respectively.

It is a well known result of Maxwell's equations that phase changes result from oblique incidence of plane waves on an interface of layered media. Given a layered medium and an angle of incidence, the reflection and transmission coefficients can be calculated to predict the fields above an infinite planar boundary. Since the majority of the measurements made in the field were made in varied topography, such as in the mountains of Idaho and Nevada, the effects of the topography were quantified. This model was parameterized so an optimization routine can minimize the difference between the model and the observed data. The optimization was capable of finding very close matches to the majority of sferics used. Furthermore, the results were within the bounds of what was considered acceptable and appropriate as governed by advance knowledge of the parameters.

Figure 11C:
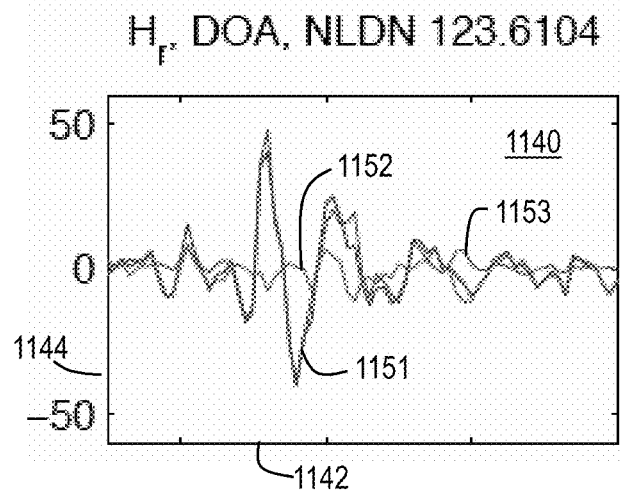
FIGS. 11C through 11E are graphs that illustrate example local topography effects computed for each component of a VLF electromagnetic signal measured at a VLF receiver, according to an embodiment.
Figure 11D:
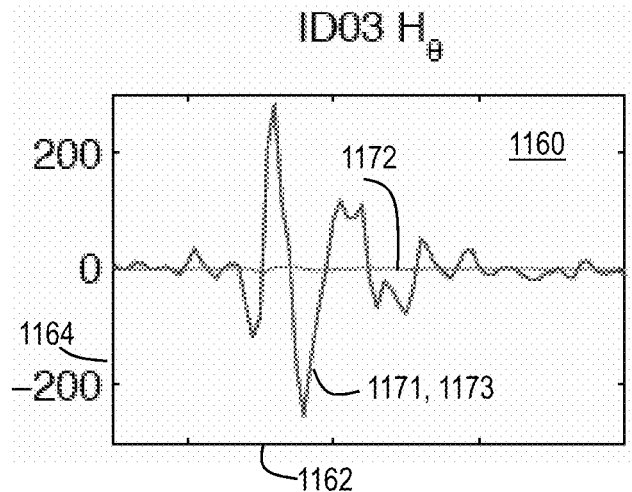
Figure 11E:
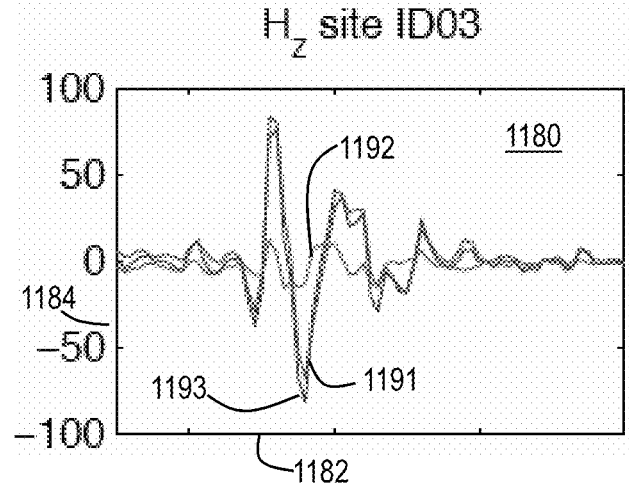
Figure 12E:
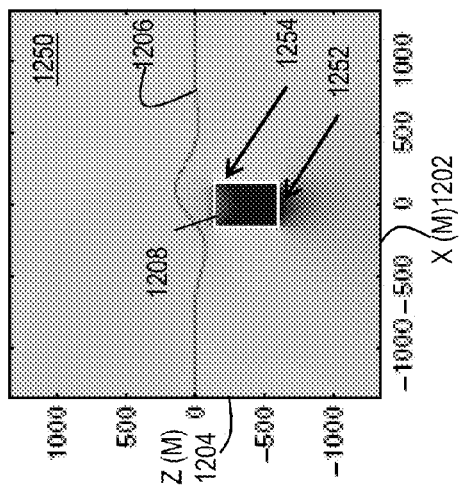
FIGS. 12A through 12F are graphs that illustrate example modeled changes in amplitude and phase for each of three components of a VLF field due to a buried conductivity and permittivity anomaly, according to an embodiment.
Figure 12F:
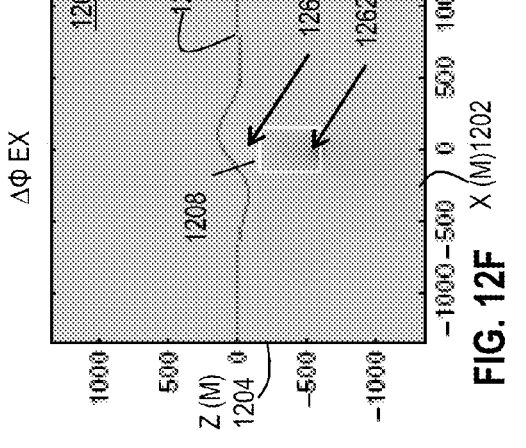
Figure 12C:
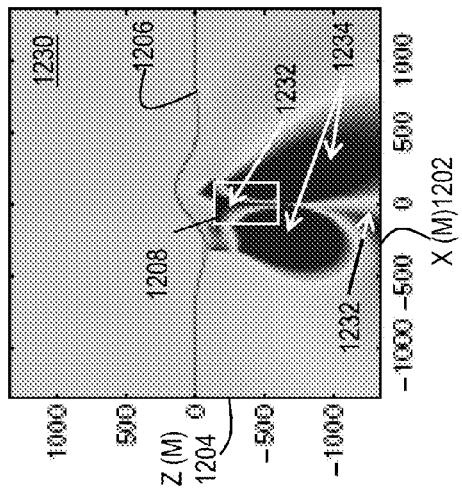
Figure 12D:
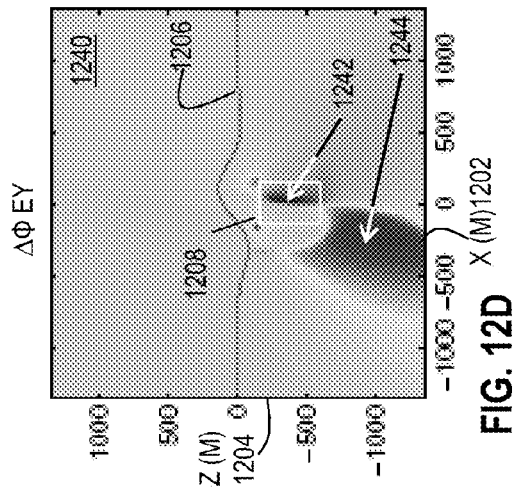
Figure 12A:
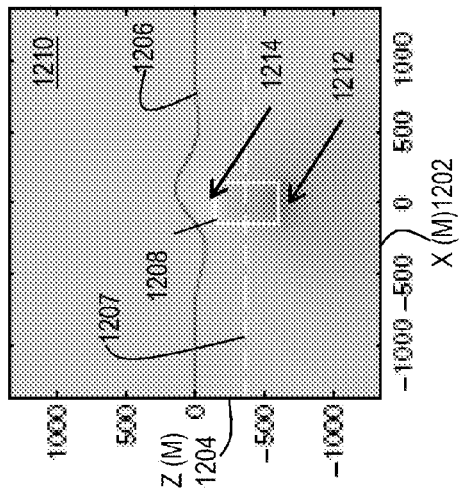
Figure 12B:
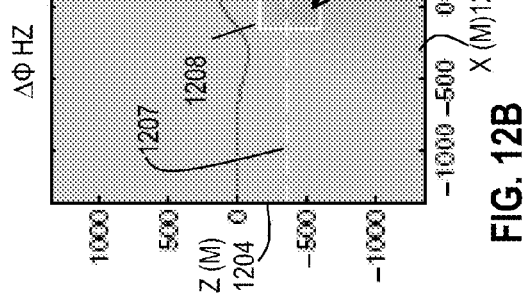

FIGS. 11C through 11E are graphs 1140, 1160, 1180, respectively, which illustrate example local topography effects computed for each component of a VLF electromagnetic signal measured at a VLF receiver, according to an embodiment. The VLF receiver is ID03. The horizontal axes 1142, 1162 and 1182 represent time over 2.56 milliseconds. The vertical axes 1144, 1164 and 1184 represent field strength in picoTesla of the calibrated response to a horizontal component Hr of the sferic magnetic field in the direction of propagation, horizontal component Hθ in a horizontal direction transverse to the direction of propagation, and vertical component Hz on the horizontal loop, respectively.

In graph 1140 trace 1151 shows the original signal as recorded at the VLF receiver. The trace 1153 is the signal predicted by the 1D layered earth model. The trace 1152 shows the difference between the observed data and the model. Similarly, in graph 1160 trace 1171 shows the original signal as recorded at the VLF receiver; trace 1173 is the almost identical signal predicted by the 1D layered earth model; and, trace 1172 shows the almost zero difference between the observed data and the model. In graph 1180 trace 1191 shows the original signal as recorded at the VLF receiver; trace 1193 is the signal predicted by the 1D layered earth model; and, trace 1192 shows the difference between the observed data and the model. FIG. 11C thought 11E illustrate a rather close fit between a large portion of the observed sferic pulse and the data produced by this 1D model. In other embodiments, a subsurface structure is included in an electromagnetic wave model and the optimization fits both the topography and the subsurface structure.

This model demonstrated that a large component of the observed signal can be explained based on the fact that the measurements were taken on a sloped surface. Therefore the topography should be included in an inversion approach employed. The variation of the sferic waveforms is not completely explained by this 1D model as it represents a simplification of the underlying physics involved in wave propagation, including the presence of any horizontally limited subsurface structure.

6. INVERSION TO DERIVE ONE OR MORE UNDERGROUND STRUCTURES

In steps 323 and 325, when a sufficient number of calibrated, conditioned, selected and characterized sferics is accumulated, one or more properties of a subsurface structure, e.g., structure 132, are determined. For example, in an illustrated embodiment, an inversion method involving the Born Approximation is used. In other embodiments, a non-linear, iterative inversion process is used to image the subsurface more precisely. In some embodiments, a process similar to the Algebraic Reconstruction Techniques (ART) proposed by Dorn et al. (1999) and the method of adjoint fields for calculating the iteration steps is used to solve the inverse problem for sferic data. According to the algebraic reconstruction technique (ART), at each step of an iterative inversion process, different sources are used in succession. Thus the model is iteratively updated by using successively the information from each individual sferic.

The Born approximation has been investigated from a theoretical view for purposes of illustration. Using a plane-wave approximation of the sferic wave form, a model of the local topography is used to calculate simulated fields everywhere. Then, a few frequencies are selected from the sferic wave forms for use in the inversion.

A finite difference frequency domain (FDFD) model has been developed for modeling electromagnetic propagation for sub-wavelength regimes to simulate sferic measurements for inversion. One of the difficulties raised by several embodiments is that the subsurface structure of interest, such as the pockets of mineralization, and the locations of interest, e.g., in the mountains, involve structures substantially smaller than the wavelength (on the order of 12 km and greater) used for imaging. Most computational techniques for calculating electromagnetic propagation such as finite difference time domain (FDTD) and discontinuous galerkin approaches are optimized for modeling objects that span multiple wavelengths. By switching to a frequency domain technique, the wave fields can be accurately simulated with very fine spatial resolution. By discretizing Maxwell's equations as in Equation 1, one can solve for the fields in the computational domain implicitly as a matrix operation.

$$\begin{bmatrix} -(i\omega\epsilon + \sigma) & \nabla x \\ \nabla x & i\omega\mu \end{bmatrix} \begin{bmatrix} E \\ H \end{bmatrix} = \begin{bmatrix} J_s \\ M_s \end{bmatrix} \quad (1)$$

where E is the electric field, H is the magnetic field, Js is the electric source, Ms is the magnetic source, $\nabla$ is the divergence operator, $\omega$ is angular frequency, $\sigma$ is conductivity of the medium, $\epsilon$ is permittivity of the medium, $\mu$ is permeability of the medium [at each spatial point in the volume of interest.

With this formulation and the appropriate absorbing boundary conditions, such as the standard perfectly matched layer formulation (PML), the fields can be calculated on a sub-wavelength basis.

FIGS. 12A through 12F show the perturbation of the electromagnetic fields produced by a conductivity and permittivity anomaly buried in conductive half-space. These are the variations in the VLF electromagnetic fields to be detected by system 200. Plane waves can be introduced to the computational domain by introducing appropriately phased sources along the boundary of the computational domain.

FIGS. 12A through 12F are graphs 1210, 12020, 1230, 1240, 1250 and 1260, respectively, which illustrate example simulated changes in amplitude and phase for each of three components of a VLF field due to a buried conductivity and permittivity anomaly, according to an embodiment. The amplitudes and phases of three components of the scattered fields are calculated in a 2D problem with a topography variation. The horizontal axis 1202 on each graph represents east west distance x in meters. The vertical axis 1204 on each graph represents vertical distance z in meters. The black line 1206 indicates the division between free space above and a lossy conductive half space below. The dashed white line 1207 indicates the skin depth of the lossy material. The white box 1208 indicates the boundary of a conductivity and permittivity anomaly buried underground. The incident wave is a transverse magnetic plane wave at 20 kHz incident from 45 degrees off normal.

The top row of graphs (graphs 1210, 1230 and 1250) indicate the change in amplitude produced by the buried conductor for each of three components of the magnetic field H. Graph 1210 indicates the amplitude changes of the vertical component Hz of the magnetic field detected at the horizontal loop. Graphs 1230 and 1250 indicate the amplitude changes of the north-south component Hy and east-west component Hx, respectively, of the magnetic field. Weaker deviations are indicated by areas 1212, 1232 and 1252. Stronger deviations are indicated by areas 1214, 1234 and 1254.

The bottom row of graphs (graphs 1220, 1240 and 1260) indicate the change in phase produced by the buried conductor for each of three components of the magnetic field H. Graph 1220 indicates the phase change of the vertical component Hz of the magnetic field detected at the horizontal loop. Graphs 1240 and 1260 indicate the phase changes of the north-south component Hy and east-west component Hx, respectively, of the magnetic field. Negative deviations are indicated by areas 1222, 1242 and 1262. Positive deviations are indicated by areas 1244 and 1264.

Minor deviations in the free-space above the lossy medium are detectible by the sensitive VLF receivers described herein and can be used to deduce the subsurface scattering structures.

The inverse problem is distinctly non-linear. That is the relationship between the subsurface materials and observed fields is not linear. However, under certain conditions, the inverse problem can be linearized thus easing the computational difficulties involved in solving a nonlinear problem. One such linearization is known as the Born Approximation. By assuming the that the scattered wave fields are small with respect to the incident wave fields, the inverse problem can be reduced to a linear set of equations solvable using least squares and Tikhonov regularization techniques. Preliminary work with Born Approximation methods has been done using computed simulated data, similar to that depicted in FIG. 12A through FIG. 12F, but with no topography variations. FIGS. 13a, 13B, 14A and 14B compare the reconstruction of buried materials as calculated using the Born Approximation to the correct distribution used for the simulated data.

Figure 13A:
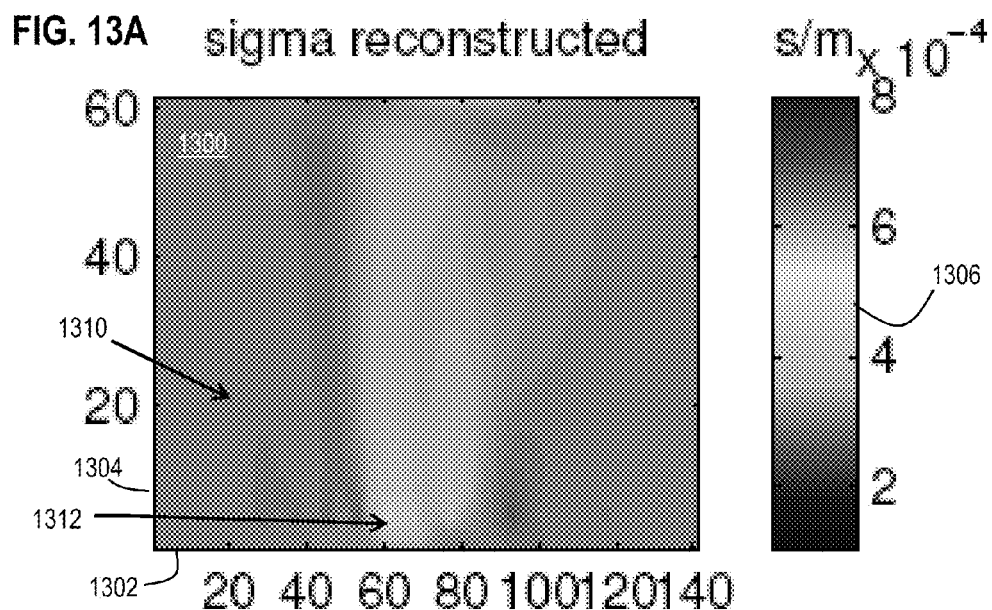
FIG. 13A is a graph that illustrates an example inferred distribution of conductivity based on computer tomography and simulated VLF signal changes, according to an embodiment.

FIG. 13A is a graph 1300 that illustrates an example inferred distribution of conductivity, $\sigma$, based on computer tomography and modeled VLF signal changes, according to an embodiment. The horizontal axis 1302 is horizontal distance in meters. The vertical axis 1304 is depth in meters. An intensity scale 1306 relates intensity to conductivity in units of siemens per meter (s/m). A region 1310 of little change is contrasted with a region 1312 of large change between horizontal distances of about 60 meters to about 80 meters, concentrated at a depth of about 5 meters with a value of about $6 \times 10^{-4}$ s/m.

Figure 13B:
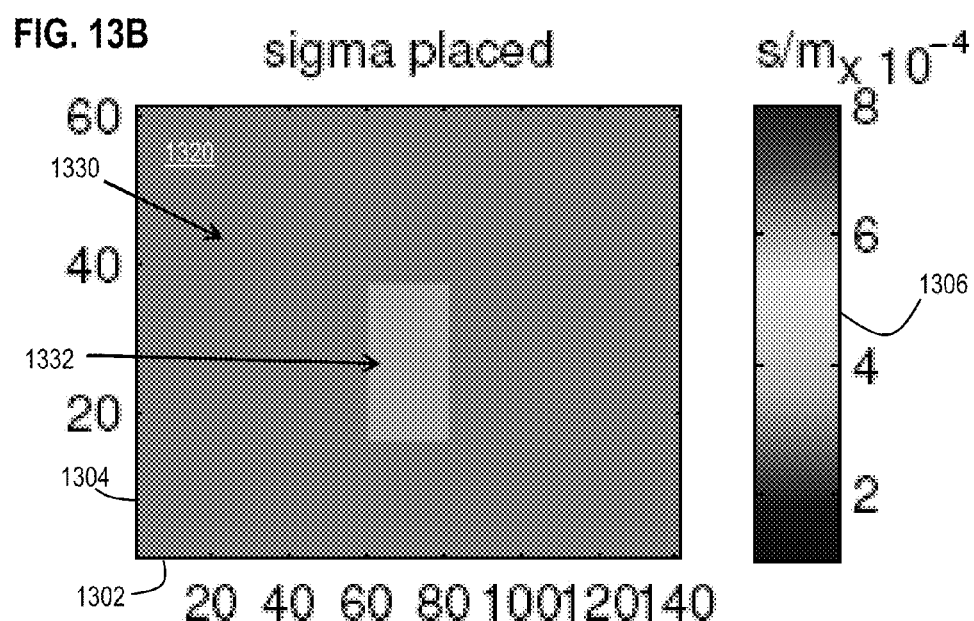
FIG. 13B is a graph that illustrates a correct distribution of conductivity used to simulate VLF signal changes, according to an embodiment.

FIG. 13B is a graph 1320 that illustrates a correct distribution of conductivity used to simulate VLF signal changes, according to an embodiment. The horizontal axis 1302 and vertical axis 1304 and intensity scale 1306 are the same as above for FIG. 13A. As can be seen, the anomaly of elevated conductivity value $6 \times 10^{-4}$ is in region 1332 between horizontal distances of 60 meters and 80 meters, as detected in FIG. 13A with a similar value for conductivity. However, the depth is 20 meters to 40 meters, somewhat deeper than the concentrated anomaly region 1312 depicted in FIG. 13A.

FIG. 14A is a graph 1400 that illustrates an example inferred distribution of relative permittivity $\epsilon$ based on computer tomography and modeled VLF signal changes, according to an embodiment. The horizontal axis 1302 and vertical axis 1304 are the same as above for FIG. 13A. An intensity scale 1406 relates intensity to relative permittivity. Relative permittivity is the ratio of the permittivity of this block of material with the permittivity of free-space, and is therefore dimensionless. A region 1410 of little change is contrasted with a region 1412 of large change between horizontal distances of about 60 meters to about 80 meters, concentrated at a depth of about 5 meters with a value of about 2.

FIG. 14B is a graph 1420 that illustrates a correct distribution of permittivity used to simulate VLF signal changes, according to an embodiment. The horizontal axis 1302 and vertical axis 1304 and intensity scale 1406 are the same as above for FIG. 14A. As can be seen, the anomaly of elevated permittivity 4 is in region 1432 between horizontal distances of 60 meters and 80 meters, as detected in FIG. 14A. However, the depth is 20 meters to 40 meters, somewhat deeper than the concentrated anomaly region 1412 depicted in FIG. 14A. And the value of about 2 indicated in FIG. 14A is somewhat less than the correct value of about 4.

In spite of some differences, the Born Approximation is successful in indicating the horizontal location and extent, as well as an approximate depth and value of conductivity and permittivity anomalies.

7. COMPUTER HARDWARE OVERVIEW

The processes described herein for mapping underground structures based on lightning induced electromagnetic pulses (EMPs), including one or more steps of the processes of FIG. 3A and FIG. 3B, may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed in this section.

Figure 15:
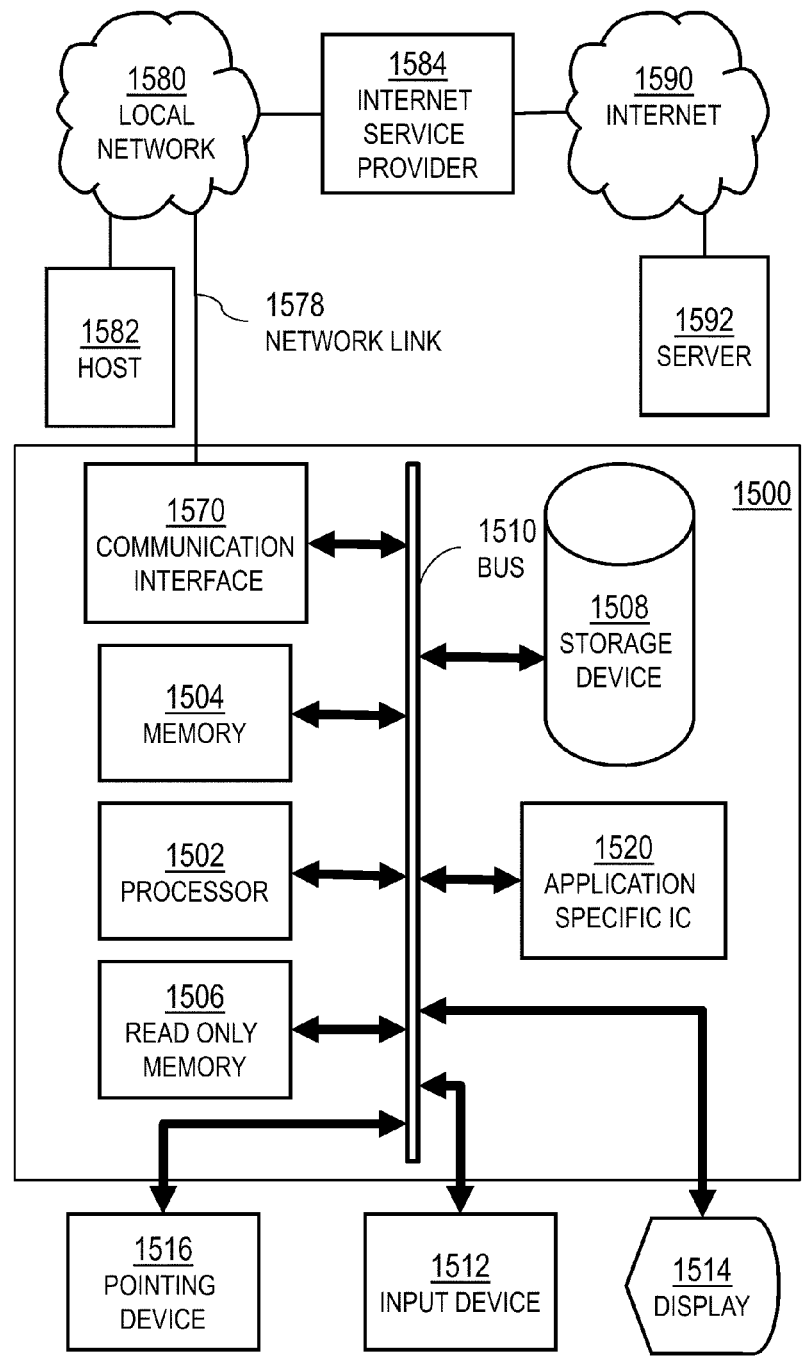
FIG. 15 is a diagram of hardware that can be used to implement an embodiment of the invention; and, FIG. 16 is a diagram of a chip set that can be used to implement an embodiment of the invention.

FIG. 15 illustrates a computer system 1500, such as the laptop computers of local processor transmitter 240 and aggregator processor 250, upon which an embodiment of the invention, including one or more steps of the processes of FIG. 3A and FIG. 3B, may be implemented. Computer system 1500 is programmed (e.g., via computer program code or instructions) to map underground structures based on lightning induced electromagnetic pulses (EMPs) as described herein and includes a communication mechanism such as a bus 1510 for passing information between other internal and external components of the computer system 1500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 15) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1500, or a portion thereof, constitutes a means for performing one or more steps of mapping underground structures based on lightning induced electromagnetic pulses (EMPs).

A bus 1510 includes one or more parallel conductors of information so that information is transferred quickly among devices coupled to the bus 1510. One or more processors 1502 for processing information are coupled with the bus 1510.

A processor 1502 performs a set of operations on information as specified by computer program code related to mapping underground structures based on lightning induced electromagnetic pulses (EMPs) The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1510 and placing information on the bus 1510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1500 also includes a memory 1504 coupled to bus 1510. The memory 1504, such as a random access memory (RAM) or other dynamic storage device, stores information including processor instructions for mapping underground structures based on lightning induced electromagnetic pulses (EMPs). Dynamic memory allows information stored therein to be changed by the computer system 1500. RAM allows a unit of information stored at a location called a memory address to be stored and retrieved independently of information at neighboring addresses. The memory 1504 is also used by the processor 1502 to store temporary values during execution of processor instructions. The computer system 1500 also includes a read only memory (ROM) 1506 or other static storage device coupled to the bus 1510 for storing static information, including instructions, that is not changed by the computer system 1500. Some memory is composed of volatile storage that loses the information stored thereon when power is lost. Also coupled to bus 1510 is a non-volatile (persistent) storage device 1508, such as a magnetic disk, optical disk or flash card, for storing information, including instructions, that persists even when the computer system 1500 is turned off or otherwise loses power.

Information, including instructions for mapping underground structures based on lightning induced electromagnetic pulses (EMPs), is provided to the bus 1510 for use by the processor from an external input device 1512, such as a keyboard containing alphanumeric keys operated by a human user, or a sensor. A sensor detects conditions in its vicinity and transforms those detections into physical expression compatible with the measurable phenomenon used to represent information in computer system 1500. Other external devices coupled to bus 1510, used primarily for interacting with humans, include a display device 1514, such as a cathode ray tube (CRT) or a liquid crystal display (LCD), or plasma screen or printer for presenting text or images, and a pointing device 1516, such as a mouse or a trackball or cursor direction keys, or motion sensor, for controlling a position of a small cursor image presented on the display 1514 and issuing commands associated with graphical elements presented on the display 1514. In some embodiments, for example, in embodiments in which the computer system 1500 performs all functions automatically without human input, one or more of external input device 1512, display device 1514 and pointing device 1516 is omitted.

In the illustrated embodiment, special purpose hardware, such as an application specific integrated circuit (ASIC) 1520, is coupled to bus 1510. The special purpose hardware is configured to perform operations not performed by processor 1502 quickly enough for special purposes. Examples of application specific ICs include graphics accelerator cards for generating images for display 1514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1500 also includes one or more instances of a communications interface 1570 coupled to bus 1510. Communication interface 1570 provides a one-way or two-way communication coupling to a variety of external devices that operate with their own processors, such as printers, scanners and external disks. In general the coupling is with a network link 1578 that is connected to a local network 1580 to which a variety of external devices with their own processors are connected. For example, communication interface 1570 may be a parallel port or a serial port or a universal serial bus (USB) port on a personal computer. In some embodiments, communications interface 1570 is an integrated services digital network (ISDN) card or a digital subscriber line (DSL) card or a telephone modem that provides an information communication connection to a corresponding type of telephone line. In some embodiments, a communication interface 1570 is a cable modem that converts signals on bus 1510 into signals for a communication connection over a coaxial cable or into optical signals for a communication connection over a fiber optic cable. As another example, communications interface 1570 may be a local area network (LAN) card to provide a data communication connection to a compatible LAN, such as Ethernet. Wireless links may also be implemented. For wireless links, the communications interface 1570 sends or receives or both sends and receives electrical, acoustic or electromagnetic signals, including infrared and optical signals, that carry information streams, such as digital data. For example, in wireless handheld devices, such as mobile telephones like cell phones, the communications interface 1570 includes a radio band electromagnetic transmitter and receiver called a radio transceiver.

The term computer-readable medium is used herein to refer to any medium that participates in providing information to processor 1502, including instructions for execution. Such a medium may take many forms, including, but not limited to, non-volatile media, volatile media and transmission media. Non-volatile media include, for example, optical or magnetic disks, such as storage device 1508. Volatile media include, for example, dynamic memory 1504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1520.

Network link 1578 typically provides information communication using transmission media through one or more networks to other devices that use or process the information. For example, network link 1578 may provide a connection through local network 1580 to a host computer 1582 or to equipment 1584 operated by an Internet Service Provider (ISP). ISP equipment 1584 in turn provides data communication services through the public, world-wide packet-switching communication network of networks now commonly referred to as the Internet 1590. A computer called a server host 1592 connected to the Internet hosts a process that provides a service in response to information received over the Internet. For example, server host 1592 hosts a process that provides information representing video data for presentation at display 1514.

At least some embodiments of the invention are related to the use of computer system 1500 for implementing some or all of the techniques described herein. According to one embodiment of the invention, those techniques are performed by computer system 1500 in response to processor 1502 executing one or more sequences of one or more processor instructions contained in memory 1504. Such instructions, also called computer instructions, software and program code, may be read into memory 1504 from another computer-readable medium such as storage device 1508 or network link 1578. Execution of the sequences of instructions contained in memory 1504 causes processor 1502 to perform one or more of the method steps described herein. In alternative embodiments, hardware, such as ASIC 1520, may be used in place of or in combination with software to implement the invention. Thus, embodiments of the invention are not limited to any specific combination of hardware and software, unless otherwise explicitly stated herein.

The signals transmitted over network link 1578 and other networks through communications interface 1570, carry information to and from computer system 1500. Computer system 1500 can send and receive information, including program code, through the networks 1580, 1590 among others, through network link 1578 and communications interface 1570. In an example using the Internet 1590, a server host 1592 transmits program code for a particular application, requested by a message sent from computer 1500, through Internet 1590, ISP equipment 1584, local network 1580 and communications interface 1570. The received code may be executed by processor 1502 as it is received, or may be stored in memory 1504 or in storage device 1508 or other non-volatile storage for later execution, or both. In this manner, computer system 1500 may obtain application program code in the form of signals on a carrier wave.

Various forms of computer readable media may be involved in carrying one or more sequence of instructions or data or both to processor 1502 for execution. For example, instructions and data may initially be carried on a magnetic disk of a remote computer such as host 1582. The remote computer loads the instructions and data into its dynamic memory and sends the instructions and data over a telephone line using a modem. A modem local to the computer system 1500 receives the instructions and data on a telephone line and uses an infra-red transmitter to convert the instructions and data to a signal on an infra-red carrier wave serving as the network link 1578. An infrared detector serving as communications interface 1570 receives the instructions and data carried in the infrared signal and places information representing the instructions and data onto bus 1510. Bus 1510 carries the information to memory 1504 from which processor 1502 retrieves and executes the instructions using some of the data sent with the instructions. The instructions and data received in memory 1504 may optionally be stored on storage device 1508, either before or after execution by the processor 1502.

Figure 16:
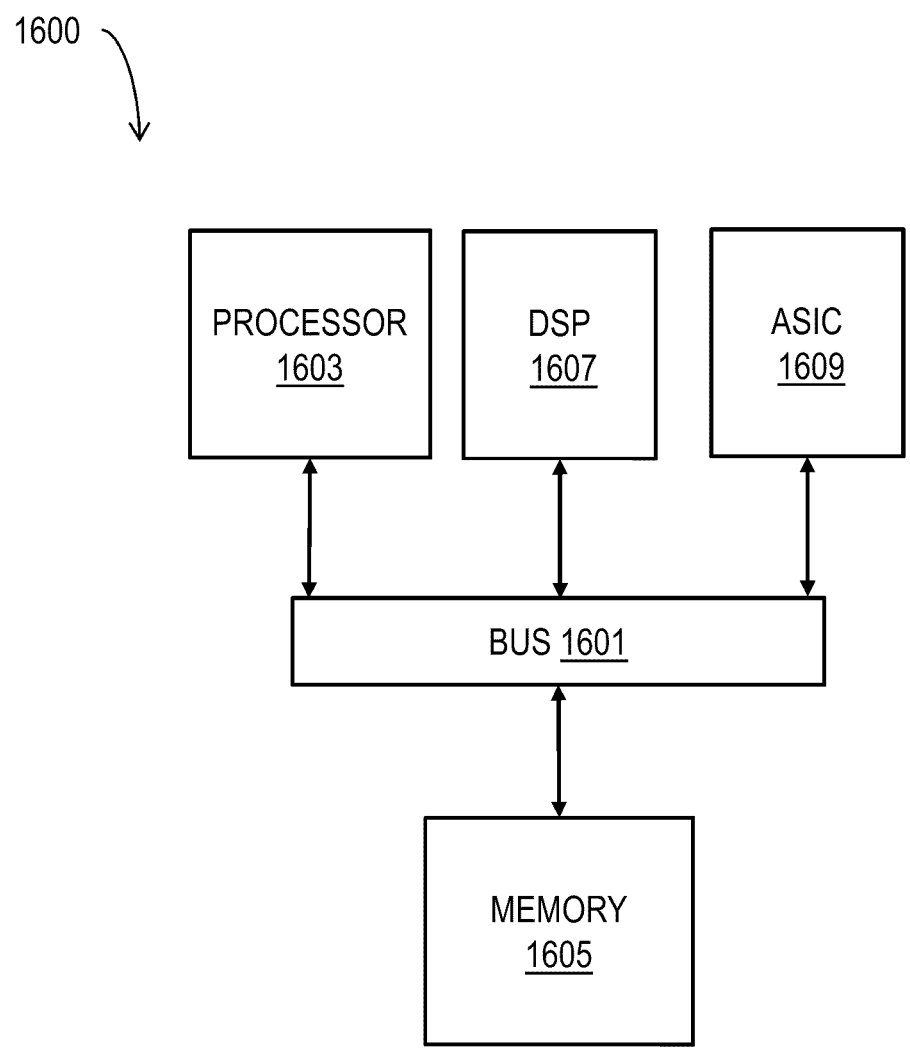

FIG. 16 illustrates a chip set 1600, such as the local processor transmitter 240 and aggregator processor 250, upon which an embodiment of the invention, including one or more steps of the processes of FIG. 3A and FIG. 3B, may be implemented. Chip set 1600 is programmed to perform one or more steps for mapping underground structures based on lightning induced electromagnetic pulses (EMPs), as described herein and includes, for instance, the processor and memory components described with respect to FIG. 15 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1600, or a portion thereof, constitutes a means for performing one or more steps for mapping underground structures based on lightning induced electromagnetic pulses (EMPs).

In one embodiment, the chip set 1600 includes a communication mechanism such as a bus 1601 for passing information among the components of the chip set 1600. A processor 1603 has connectivity to the bus 1601 to execute instructions and process information stored in, for example, a memory 1605. The processor 1603 may include one or more processing cores with each core configured to perform independently. A multi-core processor enables multiprocessing within a single physical package. Examples of a multi-core processor include two, four, eight, or greater numbers of processing cores. Alternatively or in addition, the processor 1603 may include one or more microprocessors configured in tandem via the bus 1601 to enable independent execution of instructions, pipelining, and multithreading. The processor 1603 may also be accompanied with one or more specialized components to perform certain processing functions and tasks such as one or more digital signal processors (DSP) 1607, or one or more application-specific integrated circuits (ASIC) 1609. A DSP 1607 typically is configured to process real-world signals (e.g., sound) in real time independently of the processor 1603. Similarly, an ASIC 1609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1603 and accompanying components have connectivity to the memory 1605 via the bus 1601. The memory 1605 includes both dynamic memory (e.g., RAM, magnetic disk, writable optical disk, etc.) and static memory (e.g., ROM, CD-ROM, etc.) for storing executable instructions that when executed perform one or more of the inventive steps described herein to mapping underground structures based on lightning induced electromagnetic pulses (EMPs). The memory 1605 also stores the data associated with or generated by the execution of the inventive steps.

8. REFERENCES

The following references are hereby incorporated by reference as if fully set forth herein, except insofar as any term is given a meaning that is contradictory to the meaning of that tem as defined herein.

Bracewell, R. N. "The Fourier Transform and It's Applications", McGraw Hill, 2nd Ed. 2001

Budden, K. G. (1961) The Wave-Guide Mode Theory of Wave Propagation Prentice Hall.

Chevalier, M W and U. S. Inan (2006), A technique for efficiently modeling long-path propagation for use in both FDFD and FDTD, IEEE Antennas and Wireless Propagation Letters, 5, 33, 525-8.

Cohen, M. B., U. S. Inan, and E. W. Paschal (2010), Sensitive broadband elf/vlf radio reception with the awesome instrument, IEEE Transactions on Geoscience and Remote Sensing, 48, 3-17, doi:10.1109/TGRS.2009.2028334

Cummer, S. A., and U. S. Inan (2000), Modeling elf radio atmospheric propagation and extracting lightning currents from elf observations, Radio Science, 35, 385-394, doi: 10.1029/1999RS002184.

Dorn, O., H. Bertete-Aguirre, J. Berryman, and G. Papanicolaou (1999), A nonlinear inversion method for 3D electromagnetic imaging using adjoint fields, INVERSE PROBLEMS, 15 (6), 1523-1558

Ferguson, J. A., F. P. Snyder, D. G. Morfitt, and C. H. Shellman, (1989). Long-wave propagation capability and documentation, Tech. Doc. 1518, Naval Ocean Systems Center, San Diego, Calif.

Horn, B. K. P. (2009) Fan-beam reconstruction methods, Proc. IEEE, vol 76, no. 12, 1616-1623, December 1979.

Lehtinen, N. G., R. A. Marshall, and U. S. Inan (2010), Fullwave modeling of "early" vlf perturbations caused by lightning electromagnetic pulses, Journal of Geophysical Research, 115, doi:10.1029/2009JA014776

Marshall, Robert. (2009). Very Low Frequency Radio Signatures of Transient Luminous Events Above Thunderstorms. PhD Thesis. Stanford University.

Said, R. K. (2009), Accurate and efficient long-range lightning geo-location using a vlf radio atmospheric waveform bank, Ph.D. thesis, Stanford University.

9. ALTERNATIVES AND MODIFICATIONS

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:
1. A method comprising:
    detecting lightning induced electromagnetic pulses; and
    determining, on a processor, a physical property of a displaced underground structure based on the lightning induced electromagnetic pulses, wherein the physical property is at least two of horizontal location, horizontal extent, depth, vertical extent, electrical conductivity, or electromagnetic permittivity.

2. A method as recited in claim 1, further comprising positioning on a surface of the Earth a plurality of very low frequency electromagnetic receivers, wherein:
the plurality of very low frequency electromagnetic receivers bracket a geographic region of interest; and
detecting lightning induced electromagnetic pulses further comprises measuring electromagnetic signals at the plurality of very low frequency electromagnetic receivers.

3. A method as recited in claim 2, wherein each very low frequency electromagnetic receiver comprises an antenna comprising three substantively perpendicular loops of electrical conductors.

4. A method as recited in claim 3, wherein positioning the plurality of very low frequency electromagnetic receivers further comprises orienting one loop of electrical conductor of each antenna in a substantively horizontal plane.

5. A method as recited in claim 3, wherein positioning the plurality of very low frequency electromagnetic receivers further comprising orienting one loop of electrical conductor of each antenna in a substantively vertical plane substantively parallel to a fixed vertical plane.

6. A method as recited in claim 3, wherein detecting lightning induced electromagnetic pulses further comprises measuring very low frequency electromagnetic signals and calibrating, on a processor, measured signals to account for interchannel timings among signals from the loops of each very low frequency electromagnetic receiver and to convert from millivolt values at a loop of each very low frequency electromagnetic receiver to picoTesla values characterizing an incident electromagnetic signal.

7. A method as recited in claim 3, wherein determining the physical property of an underground structure further comprises determining, on a processor, a horizontal direction of propagation of a lightning induced electromagnetic pulse based on phase differences between a lightning induced electromagnetic pulse detected on two or more of the substantively perpendicular loops of electrical conductors.

8. A method as recited in claim 7, wherein determining the physical property of an underground structure further comprises:
determining, on a processor, an upstream receiver and downstream receiver of the plurality of very low frequency electromagnetic receivers based on the direction of propagation; and
determining, on a processor, a depth classification based on a delay in arrival of the lightning induced electromagnetic pulse at the downstream receiver compared to arrival at the upstream receiver.

9. A method as recited in claim 3, wherein determining the physical property of an underground structure further comprises determining, on a processor, a depth classification of a lightning induced electromagnetic pulse based on phase differences between a lightning induced electromagnetic pulse detected on two or more of the substantively perpendicular loops of electrical conductors.

10. A method as recited in claim 3, wherein determining the physical property of an underground structure further comprises determining, on a processor, a depth distribution of the physical property based on a plurality of lightning induced electromagnetic pulses in a corresponding plurality of different depth classifications.

11. A method as recited in claim 10, wherein determining the physical property of the underground structure further comprises computer tomography and a vertically layered propagation model.

12. A method as recited in claim 3, wherein each very low frequency electromagnetic receiver comprises a low noise amplifier that amplifies electromagnetic signals in a frequency band of interest from about 1.5 kiloHertz to about 50 kiloHertz without emitting airborne electromagnetic waves in the frequency band of interest substantively above an antenna noise threshold.

13. A method as recited in claim 2, wherein each very low frequency electromagnetic receiver comprises a processor and transmitter positioned about 100 meters from the antenna that is configured to receive amplified signals from the low noise amplifier and to send processed data to an aggregator processor.

14. A method as recited in claim 2, wherein determining the physical property of the underground structure further comprises determining, on a processor, the effect of local Earth surface topography on a very low frequency electromagnetic wave received on at least one of the plurality of very low frequency electromagnetic receivers.

15. A method as recited in claim 1, wherein detecting lightning induced electromagnetic pulses further comprises measuring very low frequency electromagnetic signals and removing, on a processor, narrowband very low frequency electromagnetic signals broadcast from known transmitters.

16. A method as recited in claim 1, wherein detecting lightning induced electromagnetic pulses further comprises measuring very low frequency electromagnetic signals and removing, on a processor, harmonics of power line transmissions at one of about 50 Hertz or about 60 Hertz.

17. A method as recited in claim 1, wherein detecting lightning induced electromagnetic pulses further comprises measuring very low frequency electromagnetic signals and detecting, on a processor, a pulse with sferic characteristic temporal shape and duration of about 2.50 milliseconds in a frequency band of interest from about 1.5 kiloHertz to about 50 kiloHertz.

18. A method as recited in claim 1, wherein determining the physical property of an underground structure further comprises determining, on a processor, a horizontal distribution of the physical property based on a plurality of lightning induced electromagnetic pulses in a corresponding plurality of different horizontal directions of propagation.

19. A method as recited in claim 18, wherein determining the physical property of the underground structure further comprises computer tomography and a one-dimensional propagation model.

* * * * *